(12) United States Patent
Ito et al.

(10) Patent No.: US 6,424,963 B1
(45) Date of Patent: Jul. 23, 2002

(54) DOCUMENT RETRIEVAL HAVING RETRIEVAL CONDITIONS THAT SHUFFLES DOCUMENTS IN A SEQUENCE OF OCCURRENCE

(75) Inventors: Hayashi Ito, Chiba; Mitsuhiro Sato, Kanagawa, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/379,937

(22) Filed: Aug. 24, 1999

(30) Foreign Application Priority Data

Aug. 24, 1998 (JP) .......................................... 10-251818

(51) Int. Cl.[7] .............................................. G06F 17/30
(52) U.S. Cl. ............................... 707/1; 707/3; 707/100; 707/500; 709/201
(58) Field of Search ................... 707/3, 1, 2, 4, 707/5, 6, 100, 500; 709/201

(56) References Cited

U.S. PATENT DOCUMENTS

| 5,469,354 | A | * | 11/1995 | Hatakeyama et al. | ........... 707/3 |
| 5,787,421 | A | | 7/1998 | Nomiyama | ..................... 707/5 |
| 5,987,460 | A | * | 11/1999 | Niwa et al. | ..................... 707/6 |
| 5,991,755 | A | * | 11/1999 | Noguchi et al. | ................ 707/3 |
| 6,154,737 | A | * | 11/2000 | Inaba et al. | ..................... 707/3 |
| 6,169,999 | B1 | * | 1/2001 | Kanno | ........................ 707/532 |

FOREIGN PATENT DOCUMENTS

| JP | 09153066 | 6/1997 |
| JP | 09319766 | 12/1997 |

* cited by examiner

*Primary Examiner*—John Breene
*Assistant Examiner*—Cheryl Lewis
(74) *Attorney, Agent, or Firm*—Ratner & Prestia

(57) ABSTRACT

The document retrieval unit retrieves documents in a set of retrieval object documents stored in the memory unit according to the entered retrieval condition such as retrieval word, sequences each document depending on the goodness of fit to the retrieval condition, and issues the retrieval result by shuffling the documents in the sequence by occurrence. The occurrence distribution calculating unit calculates the occurrence distribution of retrieval conditions from this sequenced retrieval results and the table of sets of sample documents stored in the memory unit. The retrieval history storage unit stores the entered retrieval condition, the sequenced retrieval result from the document retrieval unit, and the occurrence distribution of retrieval conditions calculated by the occurrence distribution calculating unit in the memory unit as retrieval history. The retrieval history processing unit graphically processes the retrieval history stored in this memory unit, and calculates the occurrence distribution of retrieval condition in each set of sample document, so that the user can easily judge the validity of the retrieval condition and the effect of the retrieval condition on the retrieval result.

15 Claims, 18 Drawing Sheets

FIG. 2

| | Retrieval condition formula | |
| --- | --- | --- |
| | A+B+C+D | |
| Rank | Goodness of fit | Document ID |
| 1 | 100.0 | 1 0 0 1 |
| 2 | 98.2 | 4 0 0 1 |
| 3 | 84.3 | 1 0 0 3 |
| 4 | 82.9 | 9 0 0 1 |
| 5 | 82.5 | 2 0 0 1 |
| 6 | 81.2 | 1 0 0 2 |
| ⋮ | ⋮ | ⋮ |
| 25 | 34.7 | 2 0 0 2 |

FIG. 3

| Set No. | Document ID |
| --- | --- |
| 1 | 1 0 0 1 |
| 1 | 1 0 0 2 |
| 1 | 1 0 0 3 |
| 1 | 1 0 0 4 |
| ⋮ | ⋮ |
| 2 | 2 0 0 1 |
| 2 | 2 0 0 2 |
| 2 | 2 0 0 3 |

| Retrieval condition formula | | |
|---|---|---|
| A+B+C+E | | |
| Rank | Goodness of fit | Document ID |
| 1 | 100.0 | 1001 |
| 2 | 98.2 | 1002 |
| 3 | 84.3 | 1004 |
| 4 | 82.9 | 1003 |
| 5 | 82.5 | 1001 |
| 6 | 81.2 | 1001 |
| ⋮ | ⋮ | ⋮ |
| 18 | 35.0 | 2001 |
| ⋮ | ⋮ | ⋮ |
| 25 | 34.7 | 2003 |
| ⋮ | ⋮ | ⋮ |
| 31 | 20.1 | 2002 |

FIG. 10

| Set No. | Document ID |
|---|---|
| 1 | 1001 |
| 1 | 1002 |
| 1 | 1003 |
| 1 | 1004 |
| ⋮ | ⋮ |
| 2 | 2001 |
| 2 | 2002 |
| 2 | 2003 |

FIG. 11

| Set No. | Document ID |
|---|---|
| 1 | 1001 |
| 1 | 1002 |
| 1 | 1003 |
| 1 | 1005 |
| ⋮ | ⋮ |
| 2 | 2101 |
| 2 | 2102 |
| 2 | 2103 |

FIG. 17

| | Retrieval condition formula | | | |
|---|---|---|---|---|
| | A+B+C+D | | | |
| Rank | Goodness of fit | Document ID | IPC | Applicant |
| 1 | 100.0 | 1001 | G06F | ABC |
| 2 | 98.2 | 4001 | G15F | DEF |
| 3 | 84.3 | 1003 | G06F | DEF |
| 4 | 82.9 | 9001 | G06F | ABC |
| 5 | 82.5 | 2001 | G15F | GHI |
| 6 | 81.2 | 1002 | G08A | JKL |
| ⋮ | ⋮ | ⋮ | ⋮ | ⋮ |
| 25 | 34.7 | 2002 | G15F | MNO |

FIG. 19

| Set No. | Attribute condition |
|---|---|
| 1 | (IPC:G06F)×(Applicant : ABC) |
| 2 | IPC:G15F |
| ⋮ | ⋮ |

FIG. 20

| Set No. | Document ID |
|---|---|
| 1 | 1001 |
| 1 | 9001 |
| ⋮ | ⋮ |
| 2 | 4001 |
| 2 | 2001 |
| 2 | 2002 |
| ⋮ | ⋮ |

| Retrieval condition No. | Retrieval condition formula |
|---|---|
| 1 | A |
| 2 | A+B |
| 3 | A+B+C |
| 4 | A+B+C+D |
| 5 | B |
| ⋮ | ⋮ |
| 100 | D+E×F |
| 101 | D×E×F |
| ⋮ | ⋮ |

DOCUMENT RETRIEVAL HAVING RETRIEVAL CONDITIONS THAT SHUFFLES DOCUMENTS IN A SEQUENCE OF OCCURRENCE

FIELD OF THE INVENTION

The present invention relates to a document retrieval method for sequencing documents according to the goodness of fit to the retrieval condition, and issuing the retrieval results according to this sequence, a recording medium in which its program is recorded, and a document retrieval apparatus, and more particularly to a document retrieval method capable of judging the relation between the retrieval condition and retrieval result easily, a recording medium in which its program is recorded, and a document retrieval apparatus.

BACKGROUND OF THE INVENTION

Recently, as a huge quantity of electronic document information has begun to circulate, such as electronic mail, electronic catalog and electronic publication, there is a mounting interest about document retrieval method and document retrieval apparatus capable of retrieving only a desired document among electronic document information.

As the document retrieval method and document retrieval apparatus for retrieving only a desired document, much has been proposed so far about the technique of document retrieval by sequencing the results of retrieval by making use of information of frequency of occurrence of characters or symbols (or words as called hereinafter). In a conventional document retrieval method by making use of information of occurrence of words, the evaluation value is set higher in words occurring often in a certain document, and the evaluation value is set lower in words not occurring in other documents, and the documents are sequence according to such index.

For example, in a conventional document retrieval method, as a standard index for calculating the word evaluation value ev, the following formula is used.

$$ev = \log(N/df) \quad \text{[Formula 1]}$$

where N is the total number of documents, and df is the number of documents in which the word of notice (the word to be retrieved or retrieval word) occurs.

In this case, for example, if the total number of documents N is 1000, and the number of documents having the retrieval word X is 10, the evaluation value evx of the retrieval word X is $evx = \log(1000/10) = 2.0$, and if the number of documents having the retrieval word Y is 100, the evaluation value evy of the retrieval word Y is $evy = \log(1000/100) = 1.0$.

The evaluation value E of each document is, for a set of all retrieval words, the sum of the product of an evaluation value e of a certain retrieval word and the frequency of the retrieval word in the document (frequency of occurrence). That is, supposing the frequency of occurrence of a certain retrieval word in document to be tf, the evaluation value Ev of the retrieval word in document is expressed in the following formula.

$$Ev = \Sigma\{tf \times ev\} = \Sigma\{tf \times \log(N/df)\} \quad \text{[Formula 2]}$$

For example, evaluation values EvA and EvB in document A and document B about retrieval word X and retrieval word Y are calculated as follows. First, the frequency of occurrence tf of retrieval word X and retrieval word Y in document A and document B is determined. Herein, in document A, the frequencies of occurrence tfAX and tfAY of retrieval word X and retrieval word Y are respectively tfAX=10 and tfAY=5, and in document B, the frequencies of occurrence tfBX and tfBY of retrieval word X and retrieval word Y are respectively tfBX=5 and tfBY=10. In this case, from formula 2, the evaluation value EA of document A and evaluation value EB of document B are calculated as follows respectively.

$$EvA = 10 \times 2.0 + 5 \times 1.0 = 25.0$$

$$EvB = 5 \times 2.0 + 10 \times 1.0 = 20.0 \quad \text{[Formula 3]}$$

Thus, in the conventional document retrieval method, mostly, the word occurring in the retrieval condition is used as the word of notice (retrieval word) when calculating the evaluation value Ev of document. That is, according to the conventional document retrieval method, the retrieval results of documents are sequenced on the basis of the evaluation value Ev of each document obtained in this manner.

However, in the conventional document retrieval method, since the document retrieval results are sequenced by integrating the information about the frequency of occurrence of retrieval word in the retrieval condition, it is hard to distinguish the individual effects of each retrieval word in the document retrieval results.

In particular, if the retrieval result conforming to the purpose of retrieval is not obtained, it is necessary to retrieve again by revising the retrieval condition (retrieval word, etc.). At this time, it was hard to understand for the user how the effect of such revision is utilized in the sequencing of the retrieval results.

SUMMARY OF THE INVENTION

The invention is devised in the light of the above background, and it is hence an object thereof to present a document retrieval method allowing the user to judge easily the validity of retrieval condition such as retrieval word and effects of retrieval condition on the retrieval result, so that the user can improve the efficiency of retrieval process, and a recording medium in which its program is recorded, and a document retrieval apparatus.

To solve the problems, a first aspect of a document retrieval method of the invention is a document retrieval method for retrieving a set of documents composed of plural documents according to an entered retrieval condition, comprising the steps of retrieving each document included in the set of retrieval object documents according to the entered retrieval condition, sequencing each document depending on the goodness of fit to the retrieval condition, and acquiring the retrieval result by shuffling the documents in the sequence by occurrence, designating a specific set of sample documents and a specific sample document included in the specific set of sample documents, detecting the sequence by occurrence in the retrieval result in each designated specific sample document according to the retrieval result, and calculating the occurrence distribution of the retrieval condition relating to the set of sample documents including the specific sample document according to the sequence by occurrence in each specific sample document.

To solve the problems, a second aspect of a document retrieval method of the invention comprises the steps of retrieving each document included in the set of retrieval object documents according to the entered retrieval condition, sequencing each document depending on the goodness of fit to the retrieval condition, and acquiring the retrieval result by shuffling the documents in the sequence by occurrence, generating a table of sets of sample documents designating the relation of a specific set of sample documents and a specific sample document according to the acquired retrieval result, detecting the sequence by occurrence in the retrieval result in each specific sample document designated in the table of sets of sample documents according to the retrieval result, and calculating the occurrence distribution of the retrieval condition relating to the set of sample documents including the specific sample document according to the sequence by occurrence in each specific sample document.

To solve the problems, a third aspect of a document retrieval method of the invention comprises the steps of retrieving each document included in the set of retrieval object documents according to the entered retrieval condition, sequencing each document depending on the goodness of fit to the retrieval condition, and acquiring the retrieval result by shuffling the documents in the sequence by occurrence, subdividing the entered retrieval condition, and generating a divided retrieval condition by arbitrarily combining the retrieval conditions in the subdivided units, designating a specific set of sample documents and a specific sample document included in the specific set of sample documents according to the divided retrieval condition and the retrieval result, detecting the sequence by occurrence in the retrieval result in each designated specific sample document according to the retrieval result, and calculating the occurrence distribution of the retrieval condition relating to the set of sample documents including the specific sample document according to the sequence by occurrence in each specific sample document.

To solve the problems, a fourth aspect of a document retrieval method of the invention comprises the steps of retrieving each document included in the set of retrieval object documents according to the entered retrieval condition, sequencing each document depending on the goodness of fit to the retrieval condition, and acquiring the retrieval result by shuffling the documents in the sequence by occurrence, preparing an attribute condition for specifying a document in a specific range, designating a specific set of sample documents and a specific sample document included in the specific set of sample documents according to the attribute condition and the retrieval result, detecting the sequence by occurrence in the retrieval result in each designated specific sample document according to the retrieval result, and calculating the occurrence distribution of the retrieval condition relating to the set of sample documents including the specific sample document according to the sequence by occurrence in each specific sample document.

A fifth aspect of a document retrieval method of the invention relates to the first to fourth aspects of the document retrieval method of the invention, in which the retrieval condition to be entered is stored preliminarily.

Each document retrieval method described above may be compiled as a program for executing in the computer, and the program can be recorded in a recording medium that can be read by the computer.

To solve the problems, a first aspect of a document retrieval apparatus of the invention is a document retrieval apparatus for retrieving a set of documents composed of plural documents according to a retrieval condition, comprising document retrieving means for retrieving each document included in the set of retrieval object documents according to the retrieval condition, sequencing each document depending on the goodness of fit to the retrieval condition, and acquiring the retrieval result by shuffling the documents in the sequence by occurrence, memory means of table of sets of sample documents for storing the table of sets of sample documents designating the relation between a specific set of sample documents and a specific sample document, and calculating means of occurrence distribution for detecting the frequency of occurrence of the retrieval condition in each specific sample document designated by the table of sets of sample documents stored in the memory means of table of sets of sample documents according to the retrieval result acquired by the document retrieving means, and calculating the occurrence distribution of the retrieval condition relating to the set of sample documents including the specific sample document according to the sequence by occurrence in each specific sample document.

To solve the problems, a second aspect of a document retrieval apparatus of the invention comprises document retrieving means for retrieving each document included in the set of retrieval object documents according to the retrieval condition, sequencing each document depending on the goodness of fit to the retrieval condition, and acquiring the retrieval result by shuffling the documents in the sequence by occurrence, generating means of table of sets of sample documents for generating the table of sets of sample documents designating the relation between a specific set of sample documents and a specific sample document, and calculating means of occurrence distribution for detecting the frequency of occurrence of the retrieval condition in each specific sample document designated in the table of sets of sample documents generated by the generating means of table of sets of sample documents according to the retrieval result acquired by the document retrieving means, and calculating the occurrence distribution of the retrieval condition relating to the set of sample documents including the specific sample document according to the sequence by occurrence in each specific sample document.

Herein, this generating means of table of sets of documents may also generate a table of sets of sample documents specifying the relation between the specific set of sample documents and the specific sample document, according to the retrieval result calculated by the document retrieval means.

To solve the problems, a third aspect of a document retrieval apparatus of the invention comprises document retrieving means for retrieving each document included in the set of retrieval object documents according to the retrieval condition, sequencing each document depending on the goodness of fit to the retrieval condition, and acquiring the retrieval result by shuffling the documents in the sequence by occurrence, divided retrieval condition generating means for subdividing the retrieval condition into retrieval conditions of specific units, and generating divided retrieval conditions by arbitrarily combining the subdivided retrieval conditions in specific units, generating means of table of sets of sample documents for generating a table of sets of sample documents designating the relation of a specific set of sample documents and a specific sample document, according to the divided retrieval conditions generated in the divided retrieval condition generating means and retrieval result obtained by the document retrieving means, and calculating means of occurrence distribution for detecting the sequence by occurrence in the retrieval result in each specific sample document of the table of sets of sample documents generated by the generating means of table of sets of sample documents according to the retrieval result acquired by the document retrieving means, and calculating the occurrence distribution of the retrieval condition relating to the set of sample documents including the specific sample document according to the frequency of occurrence in each specific sample document.

To solve the problems, a fourth aspect of a document retrieval apparatus of the invention comprises document retrieving means for retrieving each document included in the set of retrieval object documents according to the retrieval condition, sequencing each document depending on the goodness of fit to the retrieval condition, and acquiring the retrieval result by shuffling the documents in the sequence by occurrence, memory means for storing an attribute condition for specifying a document in a specific range, generating means of table of sets of sample documents for generating a table of sets of sample documents designating the relation of a specific set of sample documents and a specific sample document, according to the attribute condition stored in the memory means and the retrieval result obtained by the document retrieving means, and calculating means of occurrence distribution for detecting the sequence by occurrence in the retrieval result in each specific sample document designated by the table of sets of sample documents generated by the generating means of table of sets of sample documents according to the retrieval result acquired by the document retrieving means, and calculating the occurrence distribution of the retrieval condition relating to the set of sample documents including the specific sample document according to the sequence by occurrence in each specific sample document.

A fifth aspect of a document retrieval apparatus of the invention relates to the first to fourth aspects of the document retrieval apparatus of the invention, which further comprises retrieval condition memory means for storing plural retrieval conditions, and retrieval condition acquiring means for acquiring one or plural specific retrieval conditions from the plural retrieval conditions stored in the retrieval condition memory means, in which the retrieval condition acquiring means enters the acquired specific retrieval condition into the document retrieving means and generating mans of divided retrieval condition at a specific timing.

In these aspects of the invention, from the retrieval result obtained in the retrieval condition, the occurrence distribution of the retrieval condition relating to the set of sample documents representing the intent of retrieval can be expressed. Accordingly, when retrieved by using different retrieval conditions, by comparing the occurrence distribution of the retrieval condition relating to the set of sample documents, the goodness of fit to the retrieval condition in the set of sample documents, and the effects on the retrieval result in each retrieval condition can be easily judged.

According to the sequenced retrieval results, the set of sample documents can be generated, revised or deleted, and therefore when retrieved by using different retrieval conditions, by comparing the occurrence distribution of the retrieval condition of plural sets of sample documents, the effects on the retrieval result in each retrieval condition can be easily judged.

Further, by subdividing the retrieval condition into plural retrieval conditions and generating plural sets of sample documents in each subdivided retrieval condition, the effects on the retrieval result in each retrieval condition can be easily predicted.

Plural sets of sample documents are generated on the basis of other attributes than the contents of the document relating to the document in the retrieval result, for example, in the case of patent application specifications, on the basis of the international patent classification or filed or laid-open date, so that the retrieval results can be easily investigated from plural viewpoints.

The user can calculate the occurrence distribution of retrieval conditions relating to the set of sample documents in each one of plural retrieval conditions, and therefore when the user searches the same retrieval object repeatedly, the retrieval efficiency is enhanced. Moreover, the user can compare the plural retrieval conditions and occurrence distribution of retrieval conditions.

The document retrieval apparatus of the invention generates the occurrence distribution of retrieval conditions in each set of documents or each retrieval condition in the table of sets of sample documents from the retrieval history of retrieval condition, retrieval result, or occurrence distribution of retrieval conditions, so that the user can judge and predict more easily the effects on the retrieval result in each retrieval condition.

BRIEF DESCRIPTION OF THE DRAWINGS

FIG. 2 is a diagram showing an example of retrieval result in the document retrieval apparatus in FIG. 1.

FIG. 3 is a diagram showing an example of a table of sets of sample documents in the document retrieval apparatus in FIG. 1.

FIG. 10 is a diagram showing an example of a table of sets of sample documents in the document retrieval apparatus in FIG. 8.

FIG. 11 is a diagram showing other example of a table of sets of sample documents in the document retrieval apparatus in FIG. 8.

FIG. 17 is a diagram showing an example of retrieval result in the document retrieval apparatus in FIG. 16.

FIG. 19 is a diagram showing an example of attribute condition in the document retrieval apparatus in FIG. 16.

FIG. 20 is a diagram showing an example of a table of sets of sample documents in the document retrieval apparatus in FIG. 16.

DETAILED DESCRIPTION OF THE PREFERRED EMBODIMENTS

Figure 1:
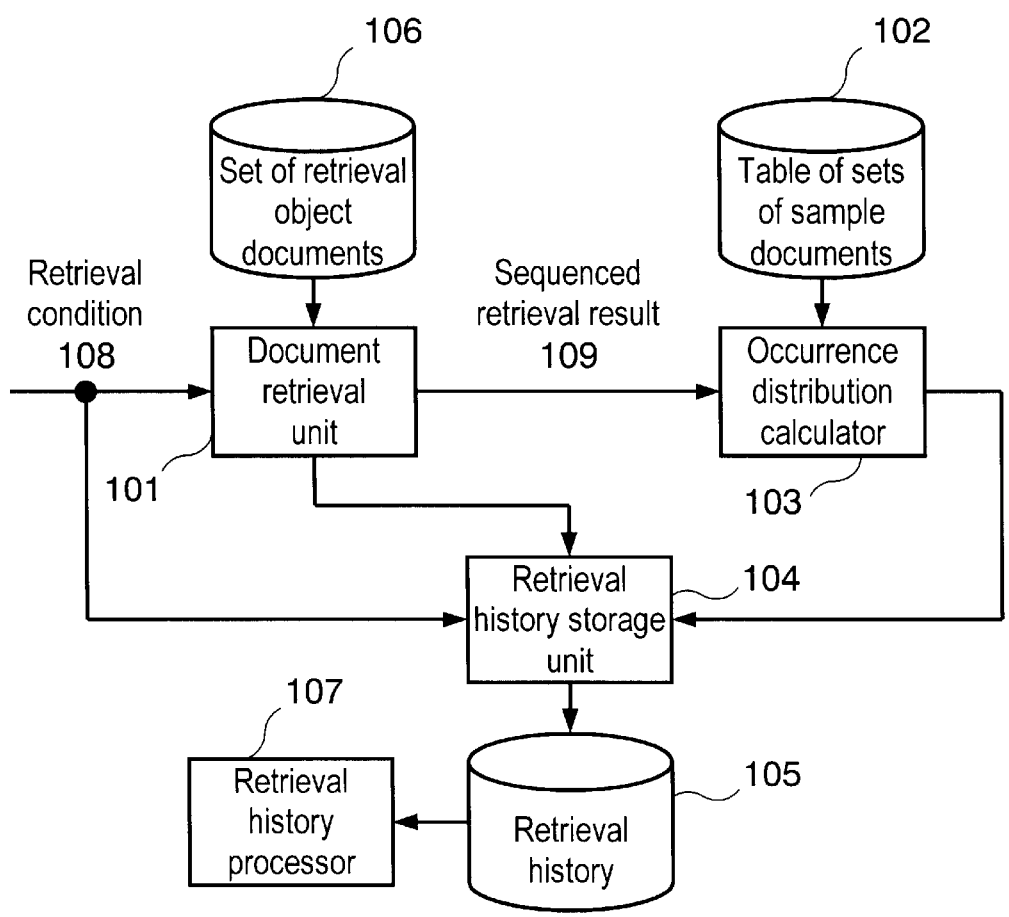
FIG. 1 is a drawing showing an entire constitution of a document retrieval apparatus in a first embodiment of the invention.

Referring now to the drawings, the document retrieval method of the invention, the recording medium in which its program is recorded, and the document retrieval apparatus are described in detail below.

(Exemplary Embodiment 1)

FIG. 1 is a schematic diagram showing an entire constitution of a document retrieval apparatus in a first embodiment of the invention. This document retrieval apparatus comprises a memory unit 106 for storing documents to be retrieved as a set of retrieval object documents, a document retrieval unit 101 for retrieving documents in the set of retrieval object documents stored in the memory unit 106 according to an entered retrieval condition such as retrieval word, a memory unit 102 for storing a table of sample-document-sets given by selecting each documents into specific groups (groups of sets), an occurrence distribution calculator 103 for calculating the occurrence distribution of retrieval conditions from the sequenced retrieval results issued from the document retrieval unit 101 and the table of sets of sample documents of the memory unit 102, a retrieval history storage unit 104 for storing the retrieval conditions, sequenced retrieval results and occurrence distribution as retrieval history, a memory unit 105 for storing the retrieval history from the retrieval history storage unit 104, and a retrieval history processor 107 for processing the retrieval history stored in the memory unit 105 graphically or the like.

Herein, in the set of documents stored in the memory unit 106, the frequency of occurrence of word may be preliminarily given in each document. The frequency of occurrence of word can be utilized when sequencing the retrieval results of the document retrieval unit 101. The memory units 102, 105, 106 and retrieval history processor 107 may not be necessarily provided within the document retrieval apparatus, but may be individually provided outside through a computer network or the like. This point is same in other embodiments.

In the document retrieval apparatus of the invention, first the document retrieval unit 101 searches each document in the set of retrieval object documents stored in the memory unit 106 according to the entered retrieval condition 108, and issues the sequenced retrieval result 109 of each document. For example, the document retrieval unit 101 searches the document coinciding with the retrieval word designated by the retrieval condition from each document in the set of retrieval object documents, and further issues the sequenced result on the basis of the goodness of fit to the retrieval condition in each retrieved document as the retrieval result.

The goodness of fit to the retrieval condition may be calculated in various manners, for example, by calculating the sum of products of feature extraction quantity of retrieval word composing the retrieval condition and the frequency of occurrence of word in each retrieval document, and obtaining the goodness of fit. In this method, the feature extraction quantity of retrieval word is defined as a reciprocal number of the frequency of occurrence in entire retrieval objects. That is, the feature extraction quantity e of retrieval word and the goodness of fit E of each document are expressed as follows, supposing the number of documents to be retrieved to be N, the number of documents having the retrieval word to be df, and the frequency of occurrence of the retrieval word in each document to be tf.

$$e = N/df$$

$$E = \Sigma(tf \times e) = \Sigma\{tf \times (N/df)\} \quad \text{[Formula 4]}$$

However, the calculating method of goodness of fit of the retrieval condition and retrieval result, that is, the degree of coinciding with the retrieval condition may be also any other method as far as the retrieval result can be sequenced according to the retrieval condition, such as the calculating method by formula 1 or formula 2 above, or other calculating method such as vector space method.

FIG. 2 is a diagram showing an example of sequenced retrieval results issued from the document retrieval unit 101. As the retrieval result issued from the document retrieval unit 101, FIG. 2 shows the retrieval condition formula as the retrieval condition entered in the document retrieval unit 101, sequence in each retrieved document, the goodness of fit used in sequencing (in FIG. 2, it is normalized so that the maximum goodness of fit may be 100), and document number for identifying the document (document ID). Herein, the retrieval condition formula is expressed as A+B+C+D. That is, A, B, C and D are retrieval words, and the symbol + refers to the logical sum joint (OR condition). The occurrence distribution calculator 103 refers to the sequenced retrieval result 109 issued from the document retrieval unit 101 and the table of sample sets stored in the memory unit 102, and calculates the occurrence distribution of retrieval conditions in each set of sample documents.

FIG. 3 is a diagram showing an example of a table of sets of sample documents stored in the memory unit 102. In the table of sets of sample documents shown in FIG. 3, the document number for identifying the document (document ID) and the set number for identifying the set of sample documents of the specific document are described by relating to each other. Also in FIG. 3, there are two sets of sample documents, and these sets of sample documents are provided with set numbers 1 and 2.

In this embodiment, the occurrence distribution of retrieval conditions in each set of sample documents is defined as a list of three values, that is, minimum sequence of occurrence, maximum sequence of occurrence and average sequence of occurrence. The occurrence distribution of retrieval condition in each set of sample documents may be defined in any method as far as each set of sample documents can be compared.

Figure 4:
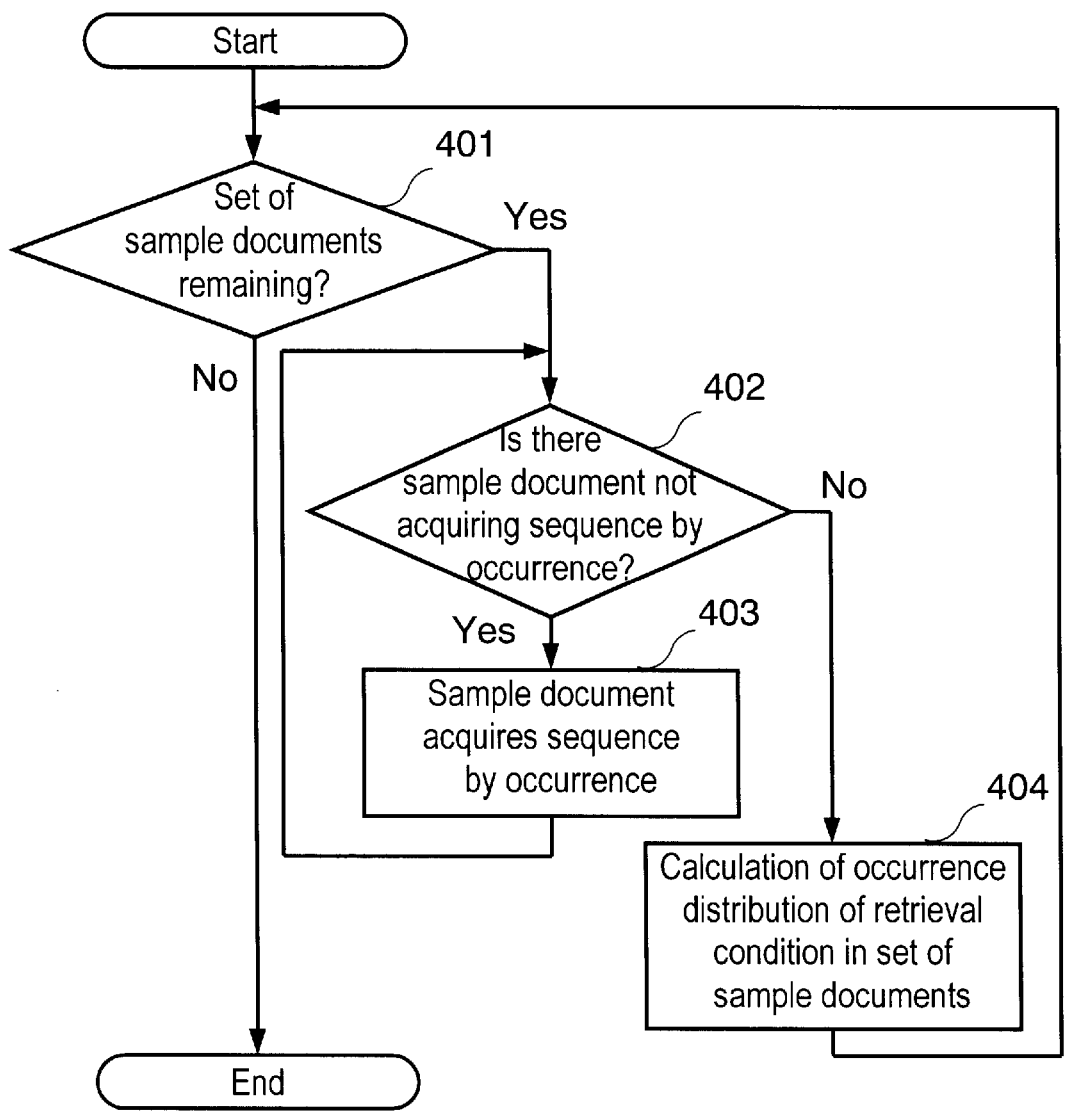
FIG. 4 is a flowchart showing the calculation process of occurrence distribution of retrieval conditions in the document retrieval apparatus in FIG. 1.

FIG. 4 is a flowchart showing the calculating method of occurrence distribution of retrieval conditions in each set of documents in the occurrence distribution calculator 103. The calculating method of occurrence distribution of retrieval conditions in each set of sample documents is explained below. First, the occurrence distribution calculator 103 refers to the table of sets of sample documents stored in the memory unit 102 (FIG. 3), and checks if there is any other set of sample documents in which the occurrence distribution of retrieval conditions is not calculated yet (step 401). If there is a set of sample documents of which occurrence distribution of retrieval conditions is not calculated yet, the occurrence distribution calculator 103 selects its set of sample documents. Therefore, the first process is to investigate the occurrence distribution of retrieval conditions relating to each document belonging to sample document set 1 (set number 1) in the table of sets of sample documents in FIG. 3.

Next, the occurrence distribution calculator 103 investigates all document IDs in the sample document set 1 to check if there is any sample document not sequenced by occurrence in the set of sample documents (step 402), and acquires the sequence by occurrence in the retrieval results until there is no sample document not sequenced by occurrence. That is, the first process is to acquire the sequence by occurrence from the retrieval result shown in FIG. 2 (step 403), about the first sample document (document ID 1001) in the sample document set 1 (set number 1 in FIG. 3). In FIG. 2, the sequence of the sample document of document ID 1001 is the first position. Similarly, in three other sample documents (document ID 1002 to 1004) included in the sample document set 1, the occurrence distribution calculator 103 acquires each sequence by occurrence from the retrieval results in FIG. 2. The occurrence distribution calculator 103, when finishing the acquisition of sequence by occurrence of four sample documents (document ID 1001 to 1004) at step 402, calculates the occurrence distribution of retrieval conditions in this set of sample documents, that is, minimum sequence by occurrence, maximum sequence by occurrence, and average sequence by occurrence (step 404). Herein, in the sample document of document ID 1004, retrieval words A, B, C, D shown in the retrieval condition formula in FIG. 2 do not appear, and hence the occurrence distribution calculator 103 sets aside the sample document of this document ID 1004 from the scope of retrieval, and calculates the occurrence distribution of retrieval conditions from the other three sample documents (document ID 1001 to 1003). In the case of this sample document set 1, (minimum sequence by occurrence, maximum sequence by occurrence, average sequence by occurrence)=(1, 6, 3.3).

Next, the occurrence distribution calculator 103 similarly calculates the occurrence distribution of retrieval conditions of sample document set 2 (steps 401 to 404). In the case of this sample document set 2, the occurrence distribution of retrieval conditions is (minimum sequence by occurrence, maximum sequence by occurrence, average sequence by occurrence)=(5, 25, 15.0). In FIG. 2, at ranks 7 to 24, other data than set numbers 1 and 2 are omitted.

As the occurrence distribution of retrieval conditions, meanwhile, other definition may be employed so that the set of sample documents can be compared. For example, considering the definition showing the rate of reproduction of sample document in the retrieval result, that is, the recall rate R of sample document (the rate obtained by dividing the number of sample documents occurring in the retrieval result by the total number of sample documents), the product of average sequence by occurrence A and reciprocal number of recall rate R (A/R) may be utilized as definition.

The occurrence distribution of retrieval conditions thus calculated in the occurrence distribution calculator 103, the sequenced retrieval results issued from the document retrieval unit 101, and the retrieval conditions entered in the document retrieval unit 101 are sent out into the retrieval history storage unit 104. The retrieval history storage unit 104 stores (records) such data in the memory unit 105 as retrieval history.

Next, the retrieval history processor 107 processes the occurrence distribution of retrieval conditions of each set of sample documents into graph or the like according to the retrieval history stored in the memory unit 105. The processing result in this retrieval history processor 107 is displayed and issued by display unit or output unit (not shown) such as display and printer.

Figures 5, 6:
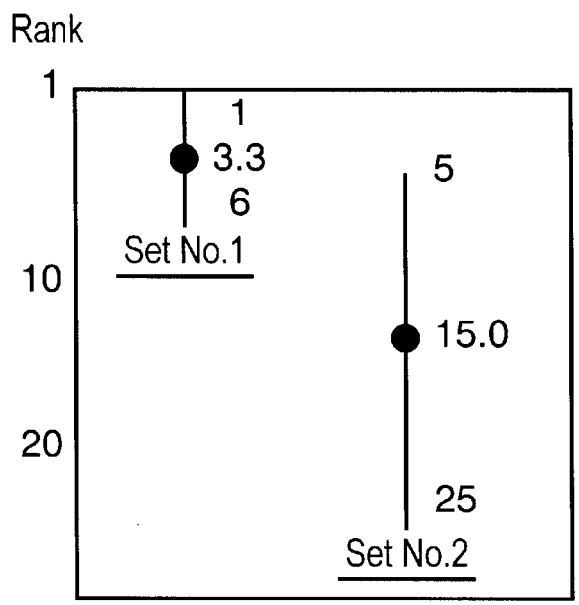
FIG. 5 is a diagram showing an example of occurrence distribution of retrieval conditions in the document retrieval apparatus in FIG. 1.
FIG. 6 is a diagram showing other example of retrieval result in the document retrieval apparatus in FIG. 1.

FIG. 5 shows a graphic processing of occurrence distribution of retrieval conditions in each set of sample documents in the retrieval history processor 107 according to the above retrieval history stored in the memory unit 105. In FIG. 5, it is shown that the sample document set 1 (set number 1) is more suited to the retrieval condition formula "A+B+C+D" than the sample document set 2 (set number 2).

Next is described the case when the retrieval condition is changed to the retrieval condition formula "A+B+C+E". This retrieval condition (retrieval condition formula "A+B+C+E") is processed same as mentioned above.

FIG. 6 shows the retrieval result issued from the document retrieval unit 101 when the retrieval condition formula of the retrieval condition is "A+B+C+E". According to this retrieval result, the occurrence distribution calculator 103 calculates the occurrence distribution of retrieval conditions about the sample document sets 1 and 2, same as mentioned above. The occurrence distribution of retrieval conditions in the sample document set 1 calculated in the occurrence distribution calculator 103 is (minimum sequence by occurrence, maximum sequence by occurrence, average sequence by occurrence)=(1, 4, 2.5), and the occurrence distribution of retrieval conditions in the sample document set 2 is (minimum sequence by occurrence, maximum sequence by occurrence, average sequence by occurrence)= (18, 31, 24.7). These retrieval conditions and calculation results are, same as above, stored (recorded) in the memory unit 105 as retrieval history by the retrieval history storage unit 104.

Figure 7:
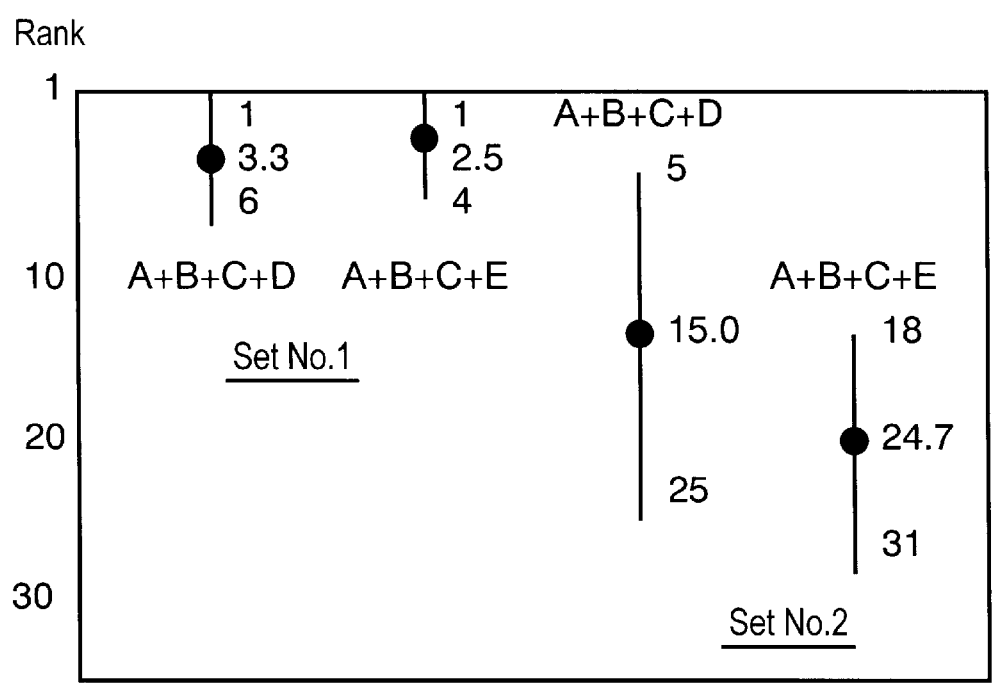
FIG. 7 is a diagram showing other example of occurrence distribution of retrieval conditions in the document retrieval apparatus in FIG. 1.

FIG. 7 shows a graphic processing of occurrence distribution of retrieval conditions in each set of sample documents in the retrieval history processor 107 according to the above retrieval history stored in the memory unit 105. In sample document sets 1 and 2, comparing the occurrence distribution of retrieval conditions in the case of the retrieval condition formula of A+B+C+D, and the occurrence distribution of retrieval conditions in the case of the retrieval condition formula of A+B+C+E, as shown in FIG. 7, the user can easily understand the effect on the retrieval result when the retrieval word E is used instead of retrieval word D in the retrieval condition.

Herein, suppose the set of documents conforming to the intent of retrieval to be sample document set 1, and the set of documents not conforming to the intent of retrieval to be sample document set 2. In this case, the sequence of occurrence distribution of retrieval conditions in the sample document set 1 (set number 1) is higher in the retrieval condition formula A+B+C+E than in the retrieval condition formula A+B+C+D, and the sequence of occurrence distribution of retrieval conditions in the sample document set 2 (set number 2) is lower in the retrieval condition formula A+B+C+E than in the retrieval condition formula A+B+C+D. Therefore, the user easily knows from FIG. 7 that the revision of the retrieval condition, that is, the revision from retrieval word D to retrieval word E is closer to the intent of the retrieval.

Thus, according to the document retrieval apparatus and document retrieval method of the embodiment of the invention, the occurrence distribution of retrieval conditions of each set of sample documents can be calculated, and the user easily compares and judges the goodness of fit of each set of sample documents to the retrieval condition and the effect on the retrieval result in each different retrieval condition.

(Exemplary Embodiment 2)

Figure 8:
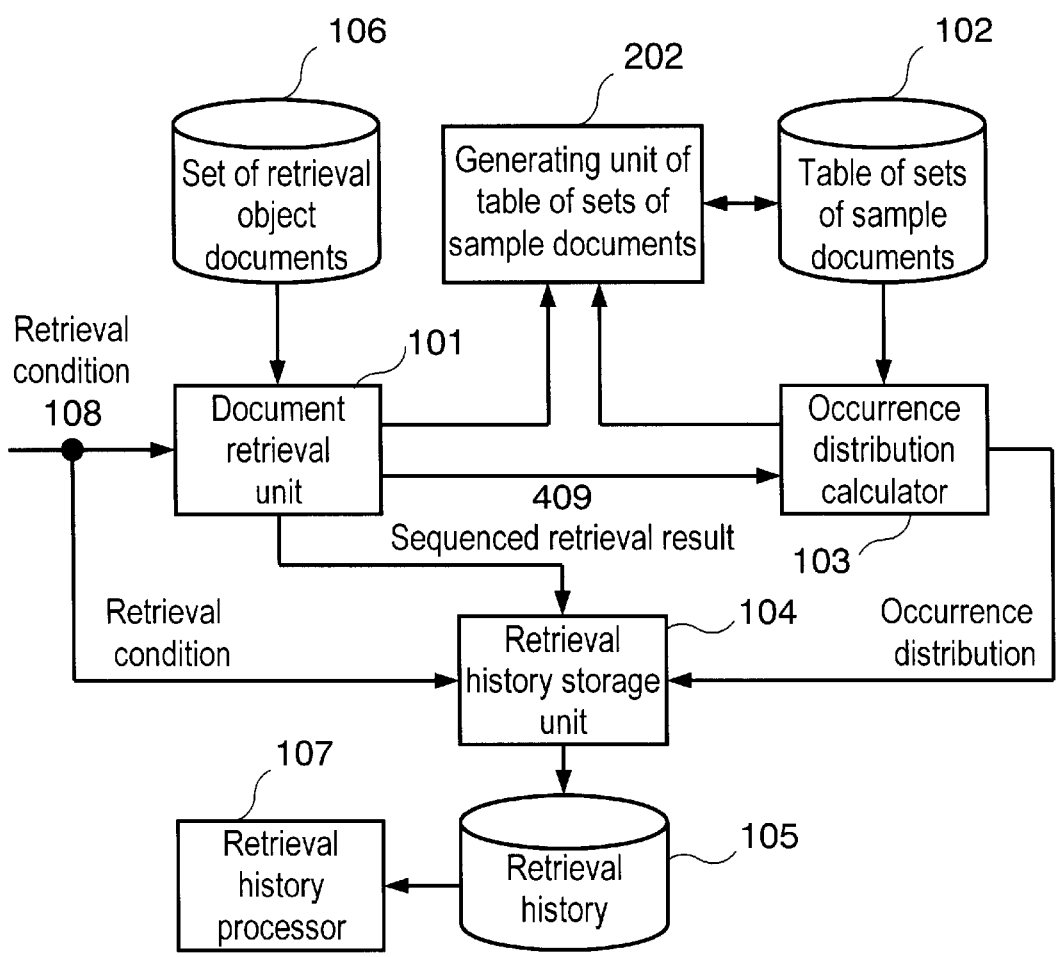
FIG. 8 is a drawing showing an entire constitution of a document retrieval apparatus in a second embodiment of the invention.

FIG. 8 shows a general constitution of a document retrieval apparatus in this embodiment. This document retrieval apparatus comprises, in addition to the constitution in FIG. 1, further a generating unit 202 of a table of sets of sample documents for generating a table of sets of sample documents from the sequenced retrieval result issued from the document retrieval unit 101 and the occurrence distribution of retrieval conditions issued from the occurrence distribution calculator 103. The components having the same functions as the constituent parts shown in FIG. 1 are identified with same reference numerals, and explanations are omitted.

The operation of the document retrieval apparatus shown in FIG. 8 is as follows.

First, the document retrieval unit 101 issues, same as explained in FIG. 1 to FIG. 7, the sequenced retrieval result 109 from the retrieval condition 108 and the set of retrieval object documents in the memory unit 106. Next, the occurrence distribution calculator 103 calculates, also same as explained in FIG. 1 to FIG. 7, the occurrence distribution of retrieval conditions from the retrieval results from the document retrieval unit 101 and the table of sets of sample documents of the memory unit 102. Hereinafter, same as explained in FIG. 1 to FIG. 7, the retrieval condition 108, sequenced retrieval result 109, and occurrence distribution of retrieval conditions are stored in the memory unit 105 through the retrieval history storage unit 104 as the retrieval history, and processed into graph or the like by the retrieval history processor 107.

On the other hand, the generating unit 202 of a table of sets of sample documents generates a new table of sets of sample documents depending on the sequenced retrieval result 109 from the document retrieval unit 101 and the occurrence distribution of retrieval conditions from the occurrence distribution calculator 103, and adds to the memory unit 102, and updates the table of sets of sample documents stored in the memory unit 102.

Figure 9:
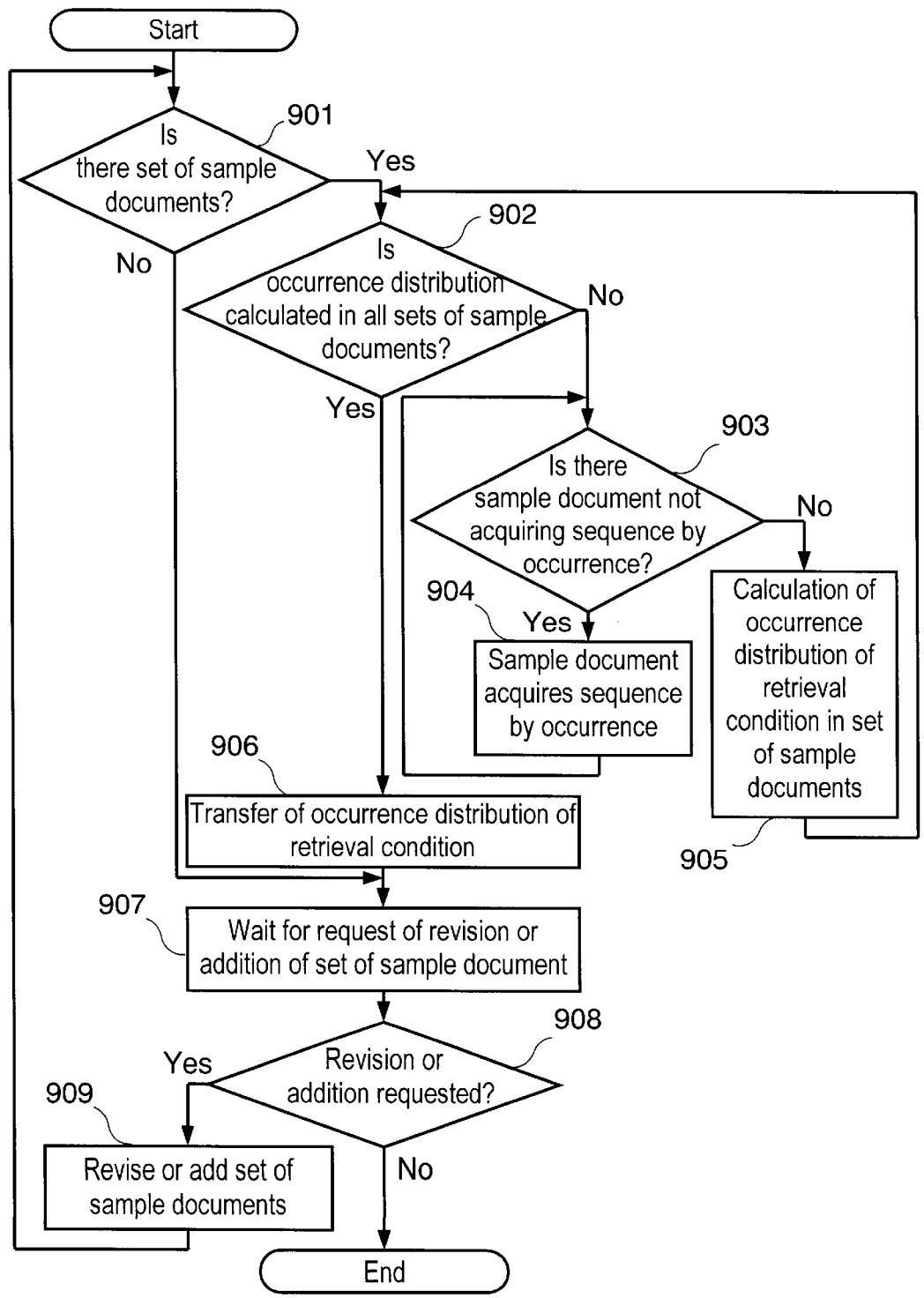
FIG. 9 is a flowchart showing retrieval process in the document retrieval apparatus in FIG. 8.

FIG. 9 is a flowchart showing the operation of the generating unit 202 of a table of sets of sample documents mainly of the document retrieval apparatus shown in FIG. 8. First of all, the generating unit 202 of a table of sets of sample documents refers to the memory unit 102, and checks if the set of sample documents is described in the table of sets of sample documents or not (step 901). When the set of sample documents is described in the table of sets of sample documents, the generating unit 202 of a table of sets of sample documents waits until the occurrence distribution of retrieval conditions is calculated in each set of sample documents from the occurrence distribution calculation 103 by the same processing as the process shown at steps 401 to 404 in FIG. 4 (step 902 to step 905). The calculated occurrence distribution of retrieval conditions is transferred to the generating unit 202 of a table of sets of sample documents (step 906). On the other hand, the occurrence distribution of retrieval conditions is processed in the retrieval history processor 107 into a graph as shown in FIG. 5, and is displayed in the display device (not shown).

The user, by this display of occurrence distribution of retrieval conditions, can compare the set of sample documents and the occurrence distribution of retrieval conditions. On the basis of this comparison, the user can consider to revise or add the table of sets of sample documents. At this time, the generating unit 202 of a table of sets of sample documents does not process but waits for request of revision or addition of the table of sets of sample documents stored in the memory unit 102 (step 907). At step 901, meanwhile, if the set of sample documents is not described in the table of sets of sample documents, the generating unit 202 of a table of sets of sample documents immediately waits for request of revision or addition of the table of sets of sample documents (step 907).

Consequently, when revision or addition of the table of sets of sample documents stored in the memory unit 102 is requested depending on the sequenced retrieval result 109 from the document retrieval unit 101 and the occurrence distribution of retrieval conditions from the occurrence distribution calculator 103 (step 908), the generating unit 202 of a table of sets of sample documents generates a new table of sets of sample documents according to the request, and revises or adds the sets of sample documents in the table of sets of sample documents stored in the memory unit 102 (step 909). In the event of such revision or addition of table of sets of sample documents, the occurrence distribution calculator 103 processes step 902 to step 905 according to the new table of sets of sample documents. The occurrence distribution calculator 103 calculates the new occurrence distribution of retrieval conditions by this process, and thereafter processes similarly at step 906 and the following.

On the other hand, revision or addition of table of sets of sample documents is not requested, the generating unit 202 of a table of sets of sample documents terminates the process (step 908). As the terminating method, an end request may be sent to the generating unit 202 of a table of sets of sample documents, or it may be designed to terminate if revision or addition is not requested within a specific time.

FIG. 10 shows a table of sets of sample documents of the memory unit 102 first used by the occurrence distribution calculator 103. The content of the table of sets of sample documents is the same content as in FIG. 3. At this time, same as shown in FIG. 1 to FIG. 7, for example in the sample document set 1, when the retrieval word indicated in the retrieval condition formula A+B+C+D is not included in the sample document of document ID 1004, the generating unit 202 of a table of sets of sample documents deletes the document ID 1004 in the sample document set 1, so that a sample document of document ID 1005 can be newly added to the sample document set 1.

FIG. 11 shows a table of sets of sample documents revising the table of sets of sample documents shown in FIG. 10. In FIG. 11, the sample document of document ID 1004 is deleted from the sample document set 1, and a sample document of document ID 1005 is newly added to the sample document set 1. Or, the existing set of sample documents may be composed as a completely new set of sample documents. FIG. 11 is an example of deleting document ID 2001, document ID 2002 and document ID 2003 (see FIG. 10) from the sample document set 2, and newly adding document ID 2101, document ID 2102 and document ID 2103, thereby generating a new sample document set 2.

In this example, a set of documents conforming to the intent of retrieval is supposed to be sample document set 1, and a set of documents not conforming to the intent of retrieval is supposed to be sample document set 2. The user can select (add or revise) the sample document (document ID) closer to the intent of retrieval as a constituent document of the set of sample documents according to the retrieval result, and therefore this example shows that the user can understand the effect of revision of retrieval condition such as table of sets of sample documents more accurately.

As described herein, according to the document retrieval apparatus and document retrieval method shown in FIG. 8 to FIG. 11, according to the result of retrieval, the table of sets of sample documents can be revised and the table of sets of sample documents can be composed more adequately, and the occurrence distribution in each set of sample documents can be calculated, so that the user can easily compare and judge the goodness of fit to the retrieval condition and the effects on the retrieval results in each different retrieval condition.

A new table of sets of sample documents can be generated, as shown in FIG. 9, by request of revision or addition of a set of sample documents in the table of sets of sample documents. When generating a new table of sets of sample documents, as shown in FIG. 10 and FIG. 11, the sample document not containing the retrieval word shown in retrieval condition 108 (document ID 1004 in FIG. 10) out of sample documents in the sample document set 1 is automatically deleted, and a sample document of a next document (document ID 1005) in FIG. 11) may be newly added to the sample document set 1.

(Exemplary Embodiment 3)

Figure 12:
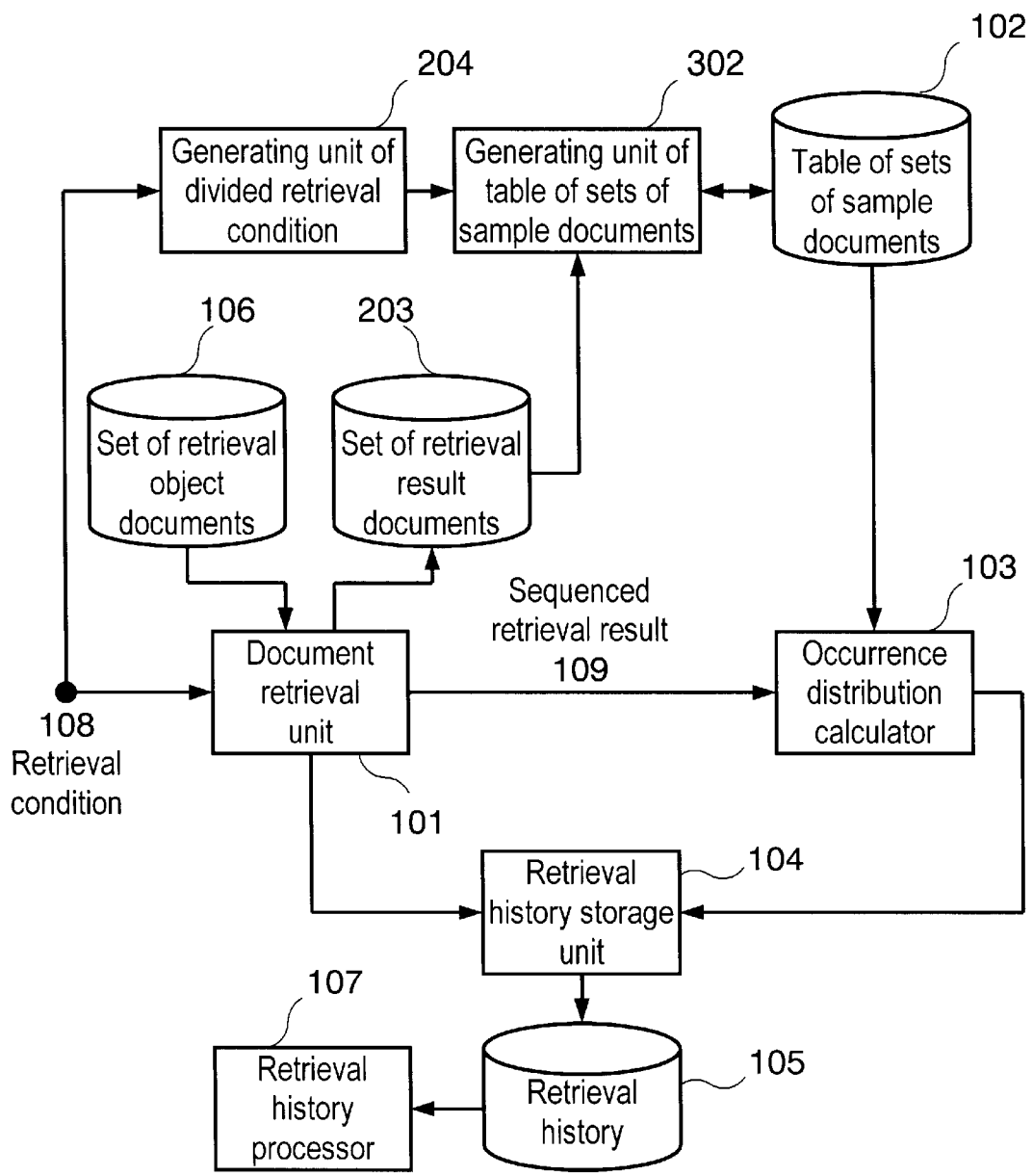
FIG. 12 is a drawing showing an entire constitution of a document retrieval apparatus in a third embodiment of the invention.

FIG. 12 shows a general constitution of a document retrieval apparatus in this embodiment. The document retrieval apparatus of this embodiment 3 comprises, in addition to the document retrieval apparatus in FIG. 1, further a memory unit 203 for storing the retrieval result issued from the document retrieval unit 101, a divided retrieval condition generating unit 204 for generating a divided retrieval condition by subdividing the entered retrieval condition, and a generating unit 302 of a table of sets of sample documents for generating a table of sets of sample documents formed into table by sorting retrieval objects documents into specific groups (groups of sets), according to the retrieval result of memory unit 203 and the divided retrieval condition generated in the divided retrieval condition generating unit 204.

The memory unit 102 is designed to store the table of sets of sample documents generated in the generating unit 302 of a table of sets of sample documents. The components having the same functions as the constituent parts shown in FIG. 1 are identified with same reference numerals, and explanations are omitted.

In the set of documents to be retrieved stored in the memory unit 106, the frequency of occurrence of word may be given preliminarily in each document. This frequency of occurrence of word can be used in sequencing the retrieval results of the document retrieval unit 101. The memory units 102, 105, 106, 203 and retrieval history processor 107 may not be necessarily provided within the document retrieval apparatus, but may be individually provided. outside through a computer network or the like.

In the document retrieval apparatus thus constituted as shown in FIG. 12, the operation is as follows. Herein, the operation of the constituent parts 101 to 107, except for the memory unit 203 for storing the set of retrieval result documents, the divided retrieval condition generating unit 204, and the generating unit 302 of a table of sets of sample documents is nearly same as in FIG. 1 to FIG. 7.

In FIG. 12, first, the document retrieval unit 101, same as explained in FIG. 1 to FIG. 7, issues the sequenced retrieval result 109 from the entered retrieval condition 108 and the set of retrieval object documents in the memory unit 106. This sequenced retrieval result 109 is transferred to the occurrence distribution calculator 103, and is also transferred to the memory unit 203, and stored in the memory unit 203 as the set of retrieval result documents.

On the other hand, the divided retrieval condition generating unit 204 analyzes the entered retrieval condition 108, and subdivides the retrieval condition, and generates the divided retrieval condition. Next, the generating unit 302 of a table of sets of sample documents newly generates a table of sets of sample documents according to the divided retrieval conditions generated in the divided retrieval condition generating unit 204 and the set of retrieval result documents stores in the memory unit 203, and stores in the memory unit 102. Hereinafter, mainly the operation of the divided retrieval condition generating unit 204 and the generating unit 302 of a table of sets of sample documents is described below.

Figure 13:
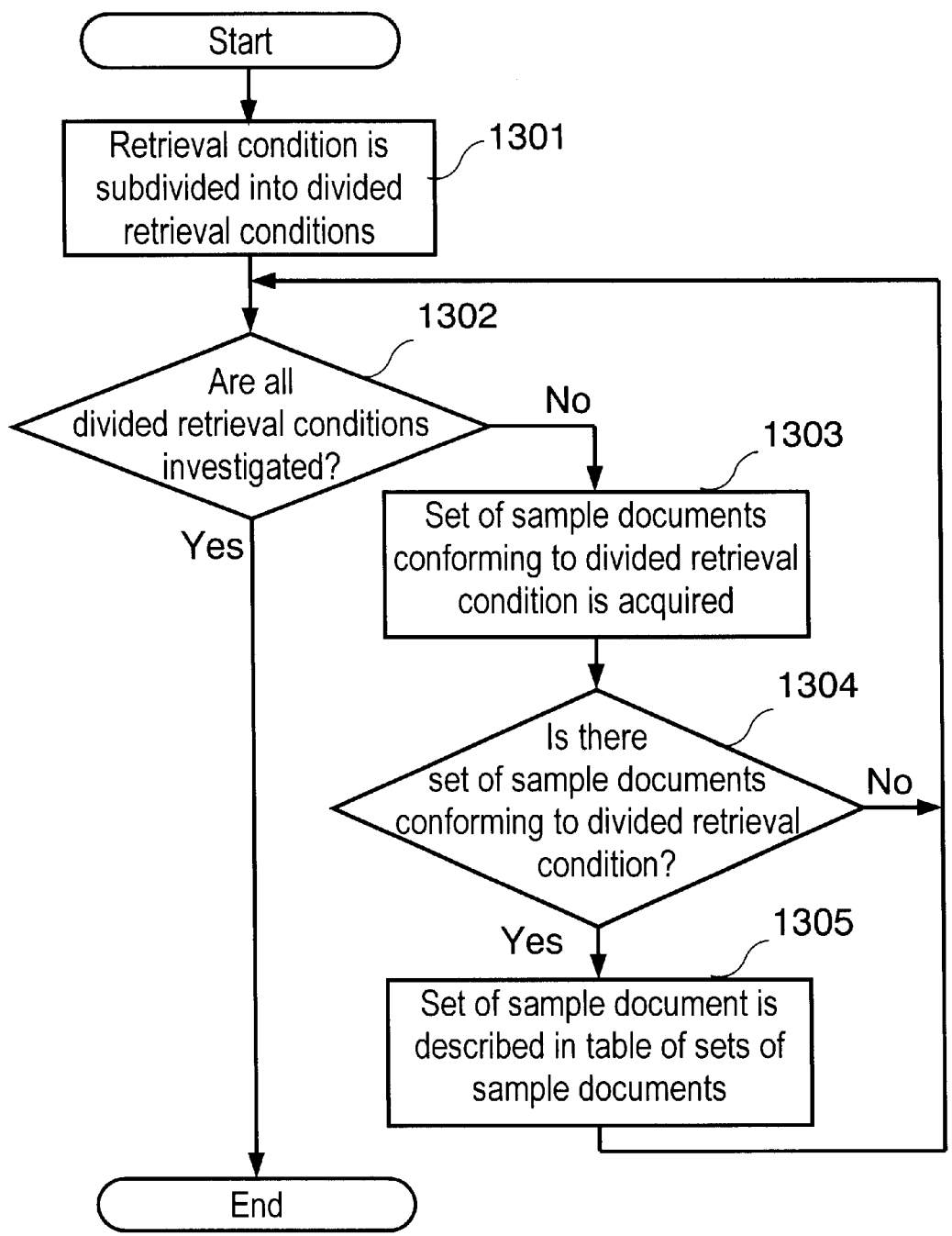
FIG. 13 is a flowchart showing generating process of a table of sets of sample documents in the document retrieval apparatus in FIG. 12.

FIG. 13 is a flowchart showing the process of the divided retrieval condition generating unit 204 and the generating unit 302 of a table of sets of sample documents. In FIG. 13, first of all, the divided retrieval condition generating unit 204 analyzes and subdivides the retrieval condition 108, and divides into divided retrieval conditions (step 1301). In the case of this embodiment, as mentioned above, the document retrieval unit 101 generates the sequenced retrieval result 109 by the feature extraction quantity of the retrieval word for composing the retrieval condition 108 and the occurrence frequency, and the divided retrieval condition generating unit 204 divides the retrieval condition 108 into each retrieval word so that the effect of the individual retrieval words may be easily judged. That is, the divided retrieval condition generating unit 204 subdivides the entered retrieval condition formula into the logical formula unit of each combination of each retrieval word. However, the retrieval word coupled by the logical product × (AND condition) is regarded to be closely related between retrieval words, and hence they are handled as one retrieval word without dividing the logical product portion of the retrieval word.

For example, when the retrieval condition 108 is the retrieval condition formula A+B+C×D (where+shows the logical sum and × denotes the logical product), the minimum units of retrieval word for composing the retrieval condition 108 are three, A, B and C×D. Therefore, the divided retrieval condition consists of these three retrieval words, and the logical sum joint by arbitrarily combining these three retrieval words.

Figure 14:
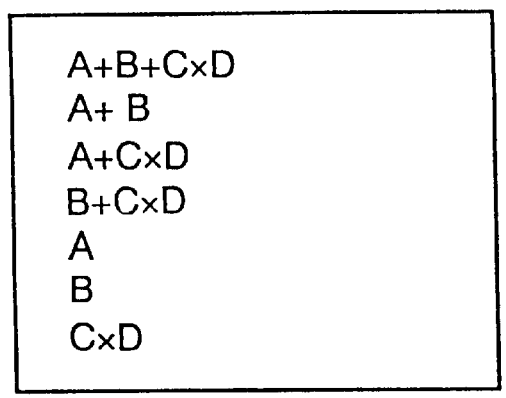
FIG. 14 is a diagram showing an example of divided retrieval condition in the document retrieval apparatus in FIG. 12.

FIG. 14 is a diagram showing the divided retrieval condition generated by the divided retrieval condition generating unit 204 from the above retrieval condition. In the example shown in FIG. 14, the retrieval condition 108 is divided into seven divided retrieval condition formulas.

The generating unit 302 of a table of sets of sample documents processes as follows in all divided retrieval conditions generated by the divided retrieval condition generating unit 204 (step 1302). First, the generating unit 302 of a table of sets of sample documents acquires a set of documents conforming to the retrieval condition from the set of retrieval result documents stored in the memory unit 203, according to the retrieval condition of the first divided retrieval condition (A+B+C×D in FIG. 14) (step 1303). Herein, since the processing at step 1303 is the retrieval process of a set of documents, the user has only to enter the divided retrieval condition in the document retrieval unit 101 to process retrieval of set of documents in the document retrieval unit 101. In this case, the retrieval results are not required to be sequenced. Therefore, instead of the document retrieval unit 101, a document set retrieval unit not having sequencing function may be provided separately.

In the processing at this step 1303, if there is a set of documents conforming to the given divided retrieval condition (step 1304), this set of documents is described in the table of sets of sample documents in the memory unit 102 as the set of sample documents corresponding to this divided retrieval condition (step 1305). Then, the next divided retrieval condition (A+B in FIG. 14) is processed same as above (step 1301 to step 1305).

On the other hand, in the processing at this step 1303, if there is no set of documents conforming to the given divided retrieval condition (step 1304), the next divided retrieval condition is processed same as above (step 1301 to step 1305).

Thus, all divided retrieval conditions are processed in this manner (step 1301 to step 1305). In this example, as shown in FIG. 14, there are seven divided retrieval conditions generated in the divided retrieval condition generating unit 204, and hence the number of tables of sets of sample documents generated by the generating unit 302 of a table of sets of sample documents is also seven. Incidentally, there is no problem if a same document (a sample document having a same document ID) may belong to plural sets of sample documents.

By using the table of sets of sample documents thus generated and stored in the memory unit 102, same as explained in FIG. 1 to FIG. 7, the occurrence distribution calculator 103 calculates the occurrence distribution of retrieval conditions in each set of sample documents. This calculated occurrence distribution of retrieval conditions and retrieval results from the document retrieval unit 101 are sent into the retrieval history storage unit 104, and stored in the memory unit 105 as retrieval history. In this embodiment, since the table of sets of sample documents is generated from the retrieval condition 108, it is not particularly required to transfer the entered retrieval condition 108 directly to the retrieval history storage unit 104 as shown in FIG. 1. However, same as in FIG. 1, the retrieval condition 108 may be also directly transferred to the retrieval history storage unit 104, or the retrieval condition 108 may be transferred from the retrieval condition generating unit 204 directly to the retrieval history storage unit 104 together with the divided retrieval condition. The retrieval history stored in the memory unit 105 is processed in the retrieval history processor 107 into a graphic form, and is shown in a display device (not shown) or the like.

Figure 15:
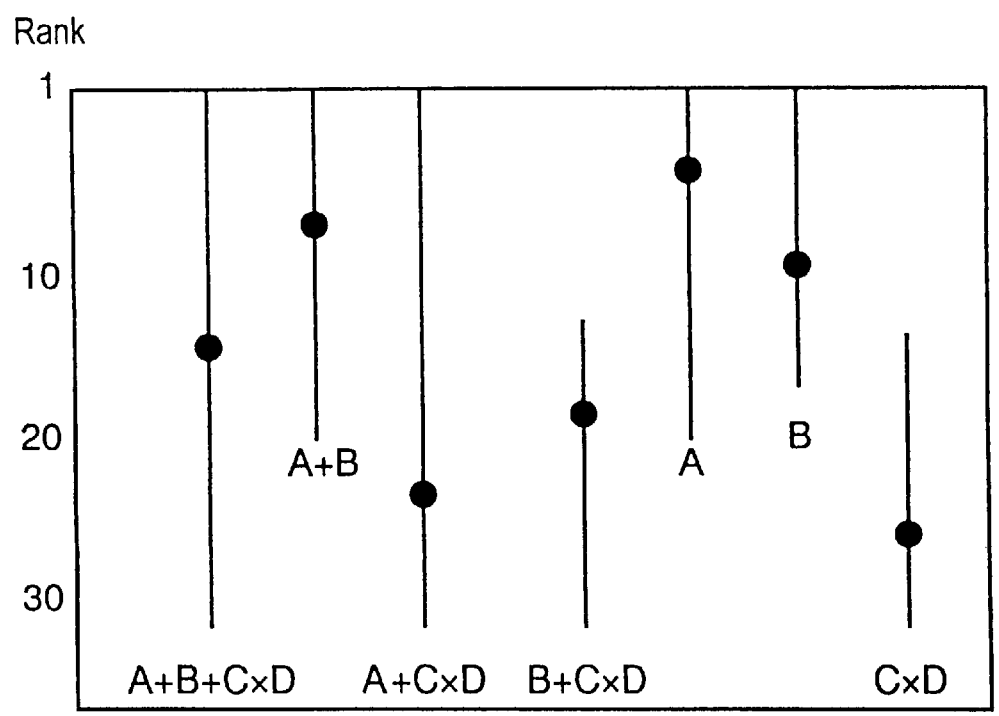
FIG. 15 is a diagram showing an example of occurrence distribution of retrieval conditions in the document retrieval apparatus in FIG. 12.

FIG. 15 is a graphic expression of occurrence distribution of retrieval condition relating to the set of sample documents generated in this embodiment. In FIG. 15, for the sake of simplicity, the specific sequence of occurrence distribution of retrieval conditions in each divided retrieval condition (minimum sequence of occurrence, maximum sequence of occurrence and average sequence of occurrence) is omitted. In the case of FIG. 15, the occurrence distribution of retrieval conditions of divided retrieval condition formulas A+B and C×D does not coincide sufficiently. Hence, if the logic formula portion of C×D is deleted from the retrieval condition 108, there is no effect on the retrieval result by the logic formula of A+B.

In this embodiment, the divided retrieval condition is generated by logical sum joint of plural retrieval words, but as far as the effects due to sequencing of retrieval words can be judged, the retrieval condition 108 may be subdivided by any dividing method. For example, regardless of the coupler of logic formula (logical sum or logical product), each retrieval word may be used as divided retrieval condition.

As shown in FIG. 12 to FIG. 15, the document retrieval apparatus and document retrieval method, the table of sets of sample documents is generated according to the retrieval condition 108, and the occurrence distribution of retrieval conditions in each set of sample documents can be calculated, so that the user can easily understand the relationship between the retrieval condition 108 and the effect on retrieval result of each retrieval word. When the user revises the retrieval condition such as retrieval word or logic formula, the user can easily predict the effect of the revision on the retrieval result.

(Exemplary Embodiment 4)

Figure 16:
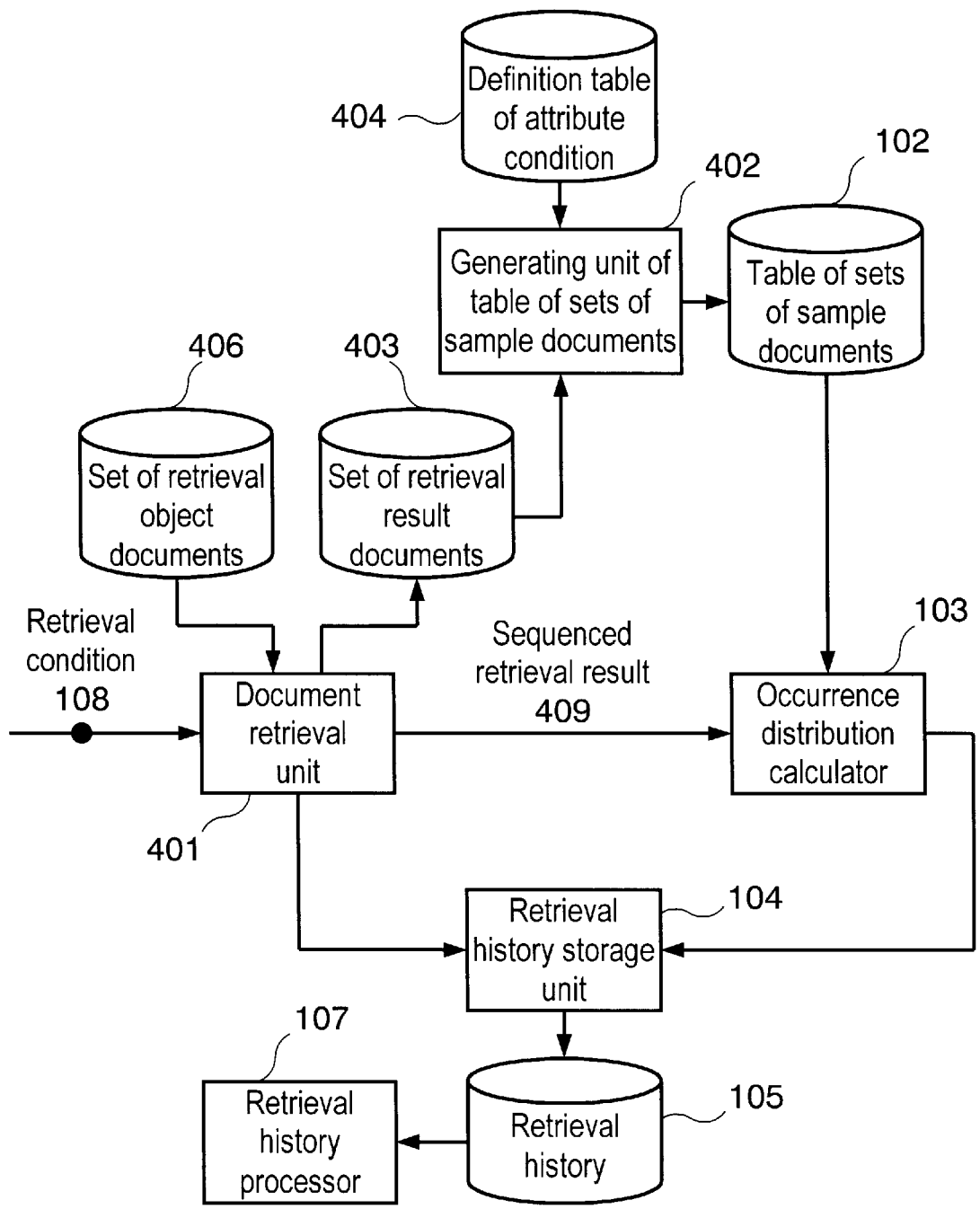
FIG. 16 is a drawing showing an entire constitution of a document retrieval apparatus in a fourth embodiment of the invention.

FIG. 16 shows an entire constitution of a document retrieval apparatus in this embodiment. This document retrieval apparatus comprises a memory unit 406 for storing documents to be retrieved provided with at least one document attribute as a set of retrieval object documents, a document retrieval unit 401 for retrieving documents in the set of retrieval object documents stored in the memory unit 406 according to an entered retrieval condition 108 such as retrieval word, sequencing depending on the goodness of fit conforming to the retrieval condition 108, and issuing the retrieval result 409 including the document attribute in each document, a memory unit 203 for storing the sequenced retrieval result 409 issued from the document retrieval unit 401, a memory unit 404 for storing the definition table of attribute conditions describing the sample document set number and the condition of document attribute to be satisfied by the set of sample documents, a generating unit 402 of a table of sets of sample documents for generating a table of sets of sample documents processed in a table form by sorting each document into specific groups (groups of sets), on the basis of the retrieval results of the memory unit 203 and the definition table of attribute conditions of the memory unit 404, a memory unit 102 for storing the table of sets of sample documents generated in the generating unit 402 of a table of sets of sample documents, an occurrence distribution calculator 103 for calculating the occurrence distribution of retrieval conditions from the sequenced retrieval result 409 issued from the document retrieval unit 401 and the table of sets of sample documents of the memory unit 102, a retrieval history storage unit 104 for storing the retrieval condition 108, sequenced retrieval result 409, and occurrence distribution of retrieval conditions as retrieval history, a memory unit 105 for storing the retrieval history from the retrieval history storage unit 104, and a retrieval history processor 107 for graphically processing the retrieval history stored in the memory unit 105.

In FIG. 16, components having the same functions as the constituent parts shown in FIG. 1, FIG. 8 or FIG. 12 are identified with same reference numerals, and detailed description is omitted.

Herein, in the set of documents stored in the memory unit 406, the frequency of occurrence of word may be preliminarily given in each document. This frequency of occurrence of word can be utilized when sequencing the retrieval results of the document retrieval unit 401. The memory units 102, 105, 203, 406 and retrieval history processor 107 may not be necessarily provided within the document retrieval apparatus, but may be individually provided outside through a computer network or the like.

In the document retrieval apparatus thus constituted as shown in FIG. 16, the operation is as follows. Herein, excluding the memory unit 203 for storing the set of retrieval result documents, the document retrieval unit 401, generating unit 402 of a table of sets of sample documents, memory unit 404 for storing the definition table of attribute conditions, and the memory unit 406 for storing the set of retrieval object documents, the operation of components 102 to 105, and 107 is nearly same as shown in FIG. 1 to FIG. 7.

In FIG. 16, first the document retrieval unit 401 sequences and issues the retrieval results from the set of retrieval object documents provided with document attributes of the entered retrieval condition 108 and memory unit 406. At this time, the document retrieval unit 401 issues also the document attribute given to each document (for example, if the sample document is a patent laid-open publication, the international patent classification, applicant, etc.) together with the retrieval result. This sequenced retrieval result 409 is transferred to the occurrence distribution calculator 103, and is also transferred to the memory unit 403, and stored in the memory unit 403 as the set of retrieval result documents.

FIG. 17 is a diagram showing the retrieval result together with the document attributes such as section, class and sub-class of international patent classification (IPC), supposing the retrieval object document stored in the memory unit 406 to be a patent laid-open publication. As shown in FIG. 17, the document retrieval unit 401 sequences each sample document depending on the goodness of fit to the retrieval condition 108, and issues as the retrieval result 409 together with the document attribute such as the document ID, IPC or applicant.

The generating unit 402 of a table of sets of sample documents retrieves the set of retrieval result documents of the memory 403 according to the definition table of attribute conditions of the memory unit 404, and generates a new table of sets of sample documents. The generating process of this table of sets of sample documents is described below.

Figure 18:
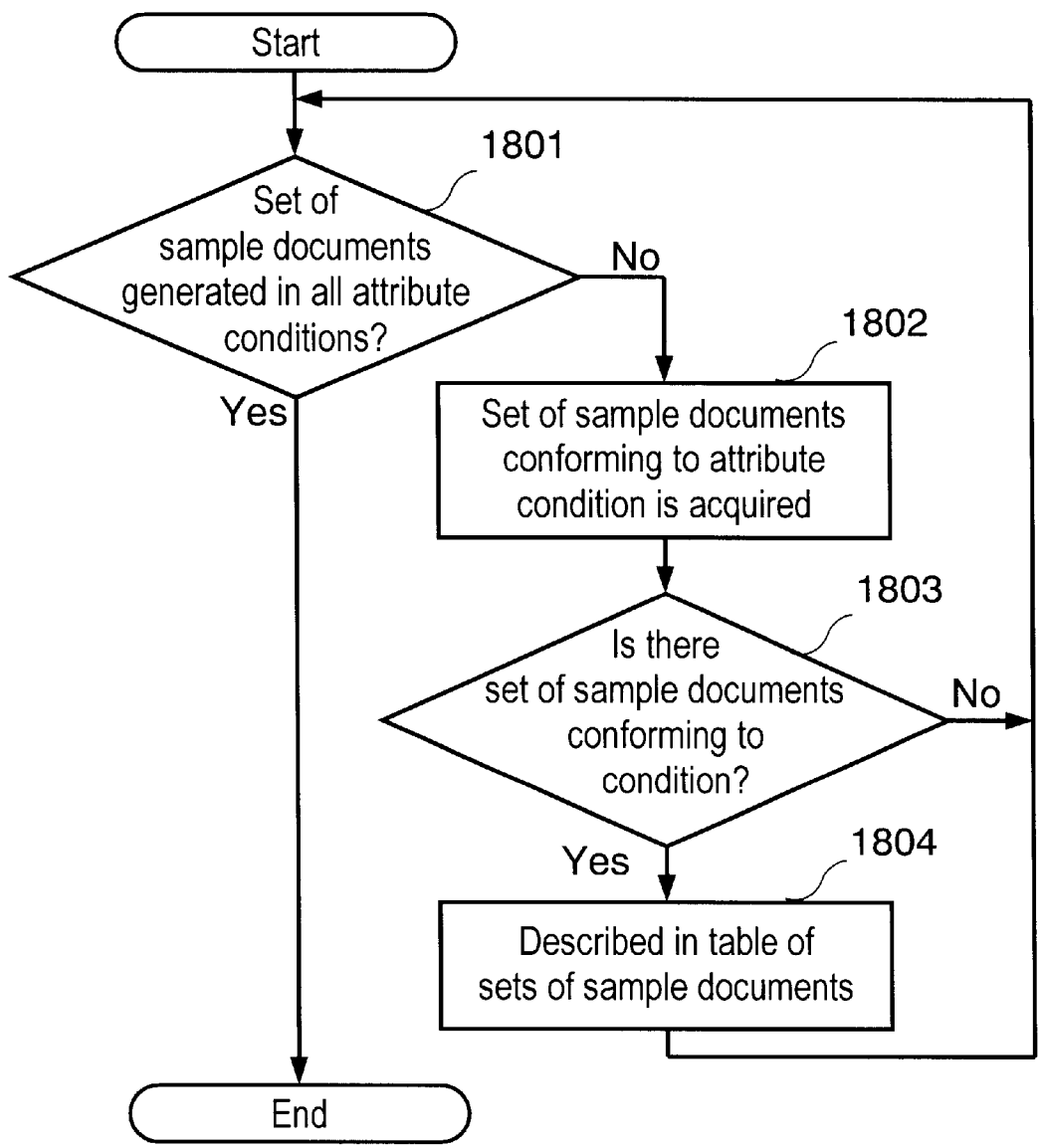
FIG. 18 is a flowchart showing generating process of a table of sets of sample documents in the document retrieval apparatus in FIG. 16.

FIG. 18 is a flowchart showing the process of the generating unit 402 of a table of sets of sample documents. FIG. 19 is a diagram showing the definition table of attribute conditions stored in the memory unit 404. The definition table of attribute conditions shown in FIG. 19 describes a newly generated set number of sample documents, and the attribute condition as the condition to be satisfied by this set of sample documents as one record. In the first record shown in FIG. 19 (set number 1), "×" denotes the logical product, and the left side of the colon ":" in parentheses indicates the document attribute and the right side shows the attribute value. Herein, the parentheses are not always necessary, and parentheses are not needed in the case of one document attribute as shown in second record (set number 2).

In FIG. 18, the generating unit 402 of a table of sets of sample documents reads out the definition table of attribute conditions stored in the memory unit 404, and processes all records described in the definition table of attribute conditions as follows. First, the generating unit 402 of a table of sets of sample documents judges if there is any unprocessed record among the records composed of sample document set numbers and attribute conditions described in the definition table of attribute conditions (step 1801), and takes out the corresponding sample document set number and attribute condition. Concerning the condition (attribute condition) to be satisfied by the newly generated sample document set 1 (set number 1), the example in FIG. 19 shows that the record to be taken out first is "IPC is G06F, and the applicant is ABC." As for the description of attribute condition in the definition table of attribute condition, if written in the natural language, for example, there is no problem as far as the required condition to be satisfied by the document attribute (for example, description of feature other than the content of the document) is presented.

Next, the generating unit 402 of a table of sets of sample documents retrieves the set of retrieval result documents stored in the memory unit 203 according to the attribute condition, and acquires the document conforming to the attribute condition. The set of acquired documents forms a new sample document set 1 (step 1802). Processing at step 1802 is a retrieval process of set of documents, and hence this process may be done by entering the attribute condition in the document retrieval unit 401, and retrieving the set of documents. In this case, it is not necessary to sequence the retrieval results. Instead of the document retrieval unit 401, a retrieval unit for a set of document not having sequencing function may be separately provided.

In processing at this step 1802, if there is a set of documents conforming to the given attribute condition (step 1803), this set of documents is described in the table of sets of sample documents in the memory unit 102 as a new sample document set 1 corresponding to this attribute condition (step 1804). Later, the generating unit 402 of a table of sets of sample documents processes the next record (attribute condition) same as above (step 1801 to step 1804).

On the other hand, in processing at step 1802, if there is no document conforming to the given attribute condition (step 1803), the generating unit 402 of a table of sets of sample documents processes the next attribute condition similarly (step 1801 to step 1804).

Thus, the generating unit 402 of a table of sets of sample documents processes all records (attribute conditions) similarly (step 1801 to step 1804).

FIG. 20 shows a table of sets of sample documents newly created in each international patent classification. In FIG. 20, by the documents of document ID 1001, 9001, . . . grouped into set number 1, the sample document set 1 satisfying the attribute condition "IPC is G06F and the applicant is ABC" is composed. Likewise, by the documents of document ID 4001, 2001, 2002, . . . grouped into set number 2, the sample document set 2 satisfying the attribute condition "IPC is G15F" is composed.

Using the table of sets of sample documents thus generated and stored in the memory unit 102, same as explained in FIG. 1 to FIG. 7, the occurrence distribution calculator 103 calculates the occurrence distribution of retrieval conditions in each set of sample documents. The calculated occurrence distribution of retrieval conditions and retrieval results from the document retrieval unit 401 are sent into the retrieval history storage unit 104, and stored as retrieval history in the memory unit 105. In the embodiment, since the table of sets of sample documents is generated from the retrieval condition 108, it is not necessary to transfer the retrieval condition 108 directly to the retrieval history storage unit 104 as in the case of FIG. 1. However, same as in FIG. 1, the retrieval condition 108 may be also transferred directly to the retrieval condition storage unit 104. The retrieval history stored in the memory unit 105 is graphically processed by the retrieval history processor 107, and is shown by a display device (not shown) or the like.

In this embodiment, the IPC and applicant are used as the attribute other than the content of the document, but any other attribute may be used as far as it is given to the document to be retrieved, such as the filed or laid-open date.

Thus, as shown in FIG. 16 to FIG. 20, the document retrieval apparatus and document retrieval method of the embodiment can generate sets of sample documents from the retrieval results depending on the document attribute of notice, and calculate the occurrence distribution of retrieval conditions in each set of sample documents, so that the user can easily study the retrieval results from plural viewpoints.

(Exemplary Embodiment 5)

Figure 21:
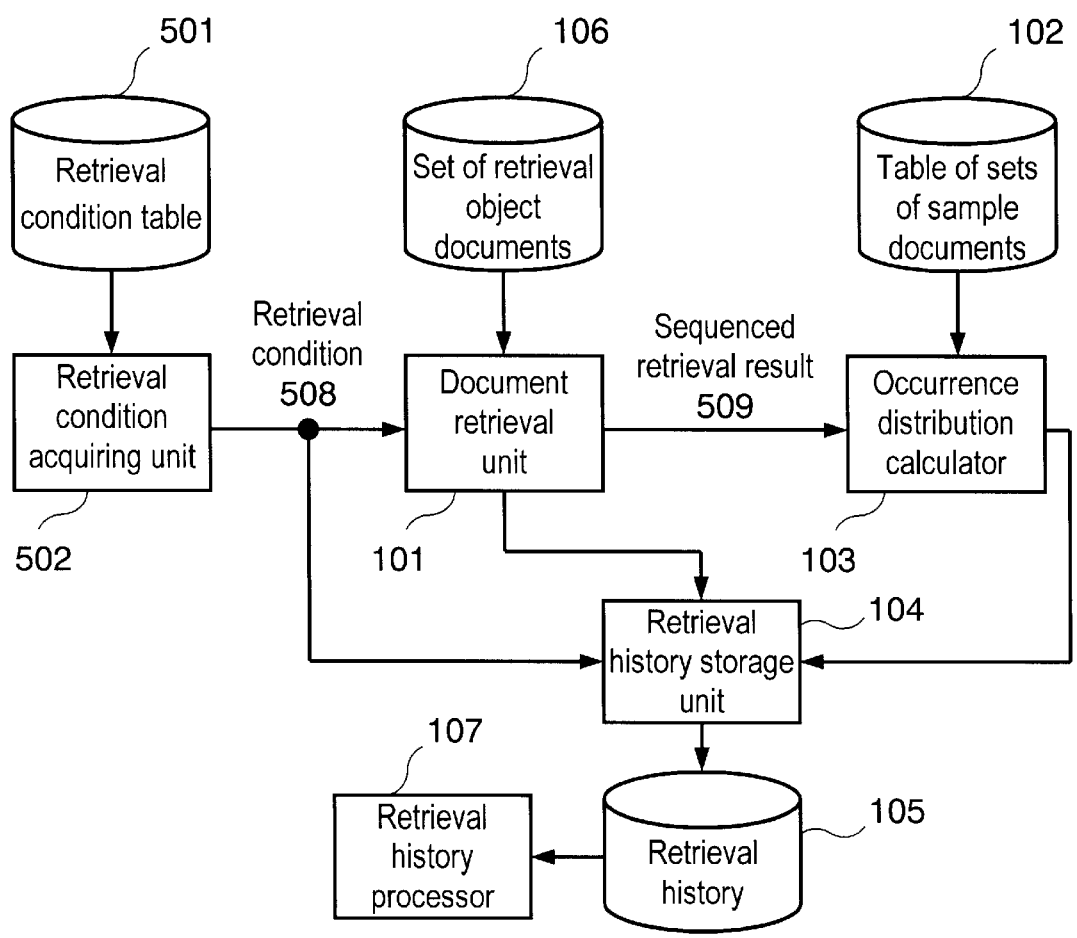
FIG. 21 is a drawing showing an entire constitution of a document retrieval apparatus in a fifth embodiment of the invention.

FIG. 21 shows an entire constitution of a document retrieval apparatus in this embodiment. What this document retrieval apparatus differs from the document retrieval apparatus in FIG. 1 is as follows: it further comprises a memory unit 501 for storing the retrieval condition such as retrieval word for document as the retrieval condition table, and a retrieval condition acquiring unit 502 for acquiring a specific retrieval condition 508 from the retrieval condition table stored in the memory unit 501, and the document retrieval unit 101 retrieves documents in the set of retrieval object documents stored in the memory unit 106 according to the retrieval condition entered from the retrieval condition acquiring unit 502.

In FIG. 21, components having the same functions as the constituent parts shown in FIG. 1 are identified with same reference numerals, and detailed description is omitted.

The operation of the document retrieval apparatus of the embodiment is as follows.

Figure 22:
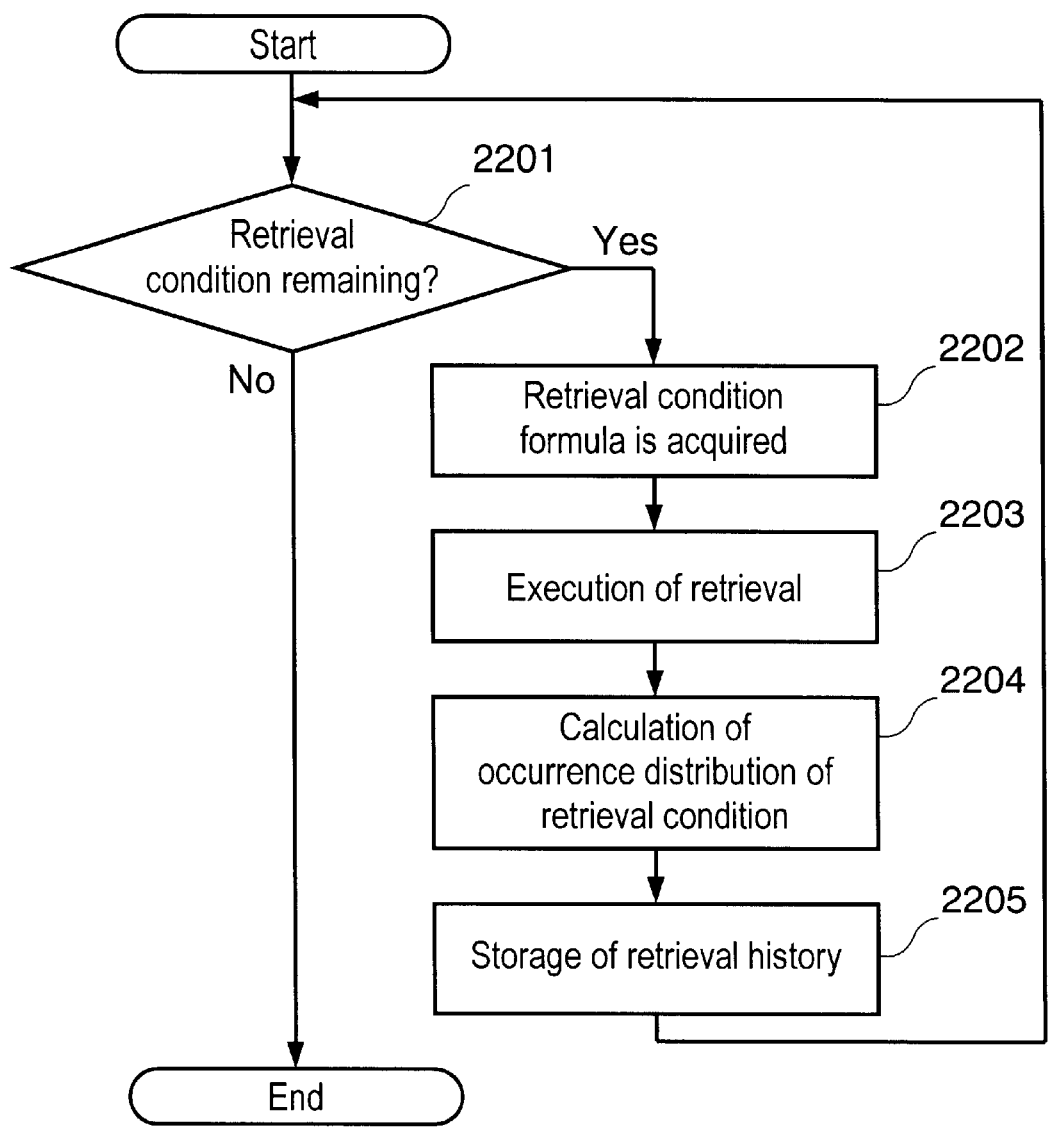
FIG. 22 is a flowchart showing retrieval process in the document retrieval apparatus in FIG. 21.
Figures 23, 24:
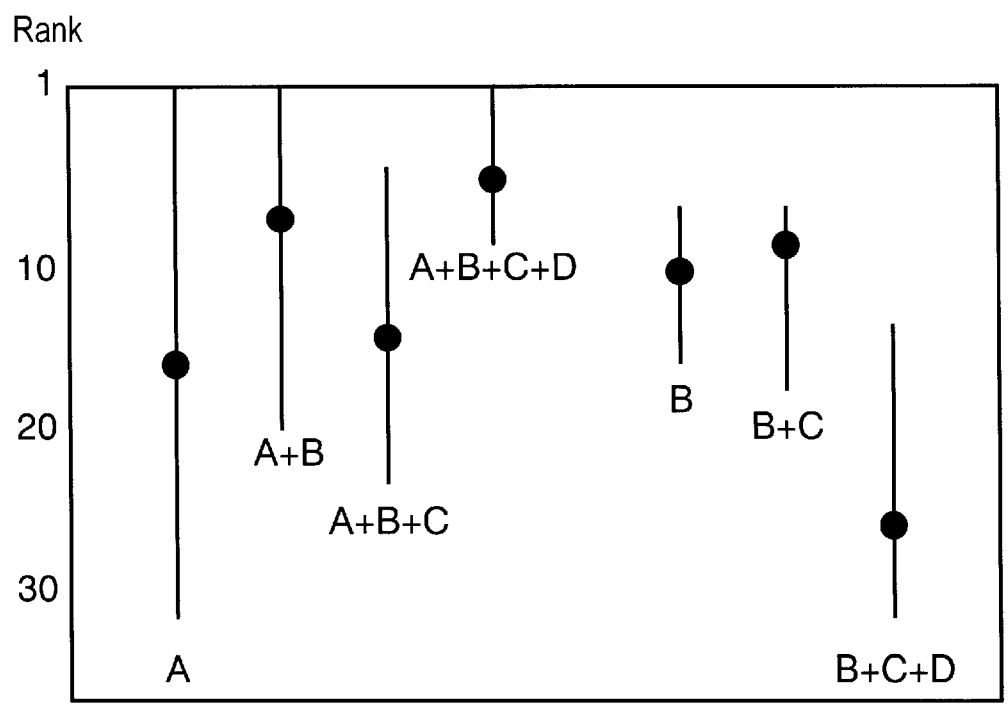
FIG. 23 is a diagram showing an example of retrieval condition in the document retrieval apparatus in FIG. 21.
FIG. 24 is a diagram showing an example of occurrence distribution of retrieval conditions in the document retrieval apparatus in FIG. 21.

FIG. 22 is a flowchart showing the document retrieval process in the document retrieval apparatus of the invention. FIG. 23 is a diagram showing an example of content of the retrieval condition table stored in the memory unit 501. In FIG. 23, the retrieval condition number for identifying the retrieval condition, and the retrieval condition formula corresponding to the retrieval condition number are described. Herein, it is preferred to be described as many retrieval conditions as possible in the retrieval condition table. The retrieval condition table may be composed by entering minimum units of retrieval conditions such as retrieval words, so that the minimum units of entered retrieval words may be arbitrary combined to compose the retrieval condition table automatically.

In FIG. 22, the retrieval condition acquiring unit 502 reads out the retrieval condition table stored in the memory unit 501. In all retrieval conditions described in the retrieval condition table, the retrieval condition acquiring unit 502 processes as follows (step 2201). First, the retrieval condition acquiring unit 502 picks up the retrieval condition from the retrieval condition table being read out. In this embodiment, as shown in FIG. 23, the retrieval condition formula A of the first retrieval condition number 1 is taken out (step 2202). The document retrieval unit 101, according to this retrieval condition formula A, retrieves the documents in the set of retrieval object documents stored in the memory unit 106, and sequences and issues the retrieval results (step 2203). The occurrence distribution calculator 103 refers to the table of sets of sample documents stored in the memory unit 102, and, same as shown in FIG. 1 to FIG. 7, the occurrence distribution calculator 103 calculates the occurrence distribution of retrieval conditions of each set of sample documents corresponding to the retrieval condition 508 (step 2204).

Consequently, the occurrence distribution of retrieval conditions calculated in the occurrence distribution calculator 103, the sequenced retrieval result 509 issued from the document retrieval unit 101, and the retrieval condition formula A entered from the retrieval condition acquiring unit 502 are sent out into the retrieval history storage unit 104. The retrieval history storage unit 104 stores these data in the memory unit 105 as retrieval history. All retrieval conditions 508 stored in the retrieval condition table are processed similarly (step 2201 to step 2205).

The retrieval history processor 107 graphically processes the occurrence distribution of each retrieval condition according to the retrieval history stored in the memory unit 105. The processing result in this retrieval history processor 107 is displayed and issued in the display device, printer, or other output device (not shown).

FIG. 24 is a graphic expression of occurrence distribution of retrieval conditions in each retrieval condition about one set of sample documents in the retrieval history processor 107 according to the retrieval history stored in the memory unit 105 above. In FIG. 24, in the case of the retrieval condition formula of A+B+C+D, it shows that the occurrence distribution of retrieval condition of this set of sample documents is located at the highest position. Therefore, in this set of sample documents to be retrieved, it is known that the retrieval condition formula of A+B+C+D is the retrieval condition formula most suited to the intent of retrieval.

Thus, according to the document retrieval apparatus and document retrieval method shown in FIG. 21 to FIG. 24, in plural prepared retrieval conditions, the user can continuously calculate the occurrence distribution of retrieval conditions in each set of sample documents, and therefore the user can efficiently execute the process of retrieving the same set of sample documents repeatedly while changing the retrieval conditions. Moreover, since the user can easily compare the effects on the retrieval results in every retrieval condition out of plural retrieval conditions, the user can easily investigate retrieval results from plural viewpoints.

Some of the preferred embodiments of the invention are described herein, and the function of the generating unit of a table of sets of sample documents shown in FIG. 8, FIG. 12 and FIG. 16, or the generating unit of divided retrieval condition shown in FIG. 12 may be applied as an arbitrary combination in the document retrieval apparatus in each embodiment. Alternatively, all of the functions shown in FIG. 8, FIG. 12 and FIG. 16 may be provided, and each function may be operated selectively.

The memory unit 501, retrieval condition acquiring unit 502, and their functions shown in FIG. 21 may be also applied in the document retrieval apparatus shown in FIG. 8, FIG. 12 and FIG. 16, and their arbitrary combination.

The individual data stored in the memory units 102, 105, 106, 203, 403, 404, 406, and 501 may be stored in each. memory region by forming plural memory regions in one memory medium (or recording medium), or may be stored in plural memory media, by dividing into groups or individually.

The document retrieval method is compiled in a program that can be executed by a computer, and the user can record such program in a memory medium, such as floppy disk, CD-ROM (compact disk read-only memory), HD (hard disk) or the like.

As described herein, the document retrieval method, recording medium recording its program, and document retrieval apparatus of the invention can calculate the occurrence distribution of retrieval condition in each set of sample documents, so that the user can easily compare and judge the goodness of fit to the retrieval condition in each set of sample documents and the effect on the retrieval result in each different retrieval condition.

According to the retrieval results, the user can revise the table of sets of sample documents and compose a more appropriate table of sets of sample documents so as to calculate the occurrence distribution of retrieval conditions in each new set of sample documents, and therefore the user can easily compare and judge the goodness of fit to the retrieval condition and the effect on the retrieval result in each different retrieval condition.

The user generates a table of sets of sample documents according to the retrieval condition, and calculates the occurrence distribution in each set of sample documents, and therefore the user can easily understand the effect on the retrieval result in each retrieval word in the retrieval condition. If the retrieval condition such as retrieval word or logical formula is revised, the user can easily predict the effect of such revision on the retrieval result.

From the retrieval result, depending on the document attribute of notice, the user generates a set of sample documents and calculates the occurrence distribution of retrieval condition in each set of sample documents, so that the user can easily investigate the retrieval results from plural viewpoints.

In plural prepared retrieval conditions, the user can calculate continuously the frequency of occurrence in each set of sample documents, so that the user can efficiently execute the process of retrieving the same set of sample documents repeatedly while changing the retrieval conditions. Moreover, since the user can easily compare the effects on the retrieval results in every retrieval condition out of plural retrieval conditions, the user can easily investigate retrieval results from plural viewpoints.

What is claimed is:

1. A document retrieval method for retrieving a set of documents composed of plural documents according to an entered retrieval condition, comprising the steps of:

retrieving each document included in the set of documents according to the entered retrieval condition, sequencing each document depending on the goodness of fit to said retrieval condition, and acquiring the retrieval result by shuffling the documents in the sequence by occurrence, designating a specific set of documents and a specific document included in said specific set of documents, detecting said sequence by occurrence in each said designated specific document, and calculating the occurrence distribution of said designated specific documents according to said retrieval condition relating to the set of documents including said designated specific document according to said sequence by occurrence.

2. A document retrieval method for retrieving a set of documents composed of plural documents according to an entered retrieval condition, comprising the steps of:

retrieving each document included in the set of documents according to the entered retrieval condition, sequencing each document depending on the goodness of fit to said retrieval condition, and acquiring the retrieval result by shuffling the documents in the sequence by occurrence, generating a table of sets of documents designating the relation of a specific set of documents and a specific document according to said retrieval result, designating a specific set of documents and a specific document included in said specific set of documents by said table of sets of documents, detecting said sequence by occurrence in each said specific document designated in said table of sets of documents, and calculating the occurrence distribution of said designated specific documents according to said retrieval condition relating to the set of documents including said designated specific document according to said sequence by occurrence.

3. A document retrieval method for retrieving a set of documents composed of plural documents according to an entered retrieval condition, comprising the steps of:

retrieving each document included in the set of documents according to the entered retrieval condition, sequencing each document depending on the goodness of fit to said retrieval condition, and acquiring the retrieval result by shuffling the documents in the sequence by occurrence, subdividing said entered retrieval condition, and generating a divided retrieval condition by arbitrarily combining the retrieval conditions in the subdivided units, designating a specific set of documents and a specific document included in said specific set of documents according to said divided retrieval condition and said retrieval result, detecting the sequence by occurrence in said retrieval result in each said designated specific document, and calculating the occurrence distribution of said designated specific documents according to said retrieval condition relating to the set of documents including said designated specific document according to said sequence by occurrence.

4. A document retrieval method for retrieving a set of documents composed of plural documents according to an entered retrieval condition, comprising the steps of:

retrieving each document included in the set of documents according to the entered retrieval condition, sequencing each document depending on the goodness of fit to said retrieval condition, and acquiring the retrieval result by shuffling the documents in the sequence by occurrence, preparing an attribute condition for specifying a document in a specific range, designating a specific set of documents and a specific document included in said specific set of documents according to said attribute condition and said retrieval result, detecting said sequence by occurrence in each said designated specific document, and calculating the occurrence distribution of said designated specific documents according to said retrieval condition relating to the set of documents including said designated specific document according to said sequence by occurrence.

5. A document retrieval method of any one of claims 1 to 4, wherein the retrieval condition to be entered is stored preliminarily.

6. A recording medium to be read by a computer recording a program for making the computer execute a document retrieval method comprising:

a step of retrieving each document included in a set of documents according to an entered retrieval condition, a step of sequencing each document depending on the goodness of fit to said retrieval condition, and acquiring a retrieval result by shuffling the documents in the sequence by occurrence, a step of designating a specific set of documents and a specific document included in said specific set of documents, a step of detecting said sequence by occurrence in each said designated specific document, and a step of calculating and displaying the occurrence distribution of said designated specific documents according to said retrieval condition relating to the set of documents including said designated specific document according to said sequence by occurrence.

7. A recording medium to be read by a computer recording a program for making the computer execute a document retrieval method comprising:

a step of retrieving each document included in a set of documents according to an entered retrieval condition, a step of sequencing each document depending on the goodness of fit to said retrieval condition, and acquiring a retrieval result by shuffling the documents in the sequence by occurrence, a step of generating a table of sets of documents designating the relation of a specific set of documents and a specific document according to said retrieval result, a step of designating a specific set of documents and a specific document included in said specific set of documents by said table of sets of documents, a step of detecting said sequence by occurrence in each said specific document designated in said table of sets of documents, and a step of calculating and displaying the occurrence distribution of said designated specific documents according to said retrieval condition relating to the set of documents including said designated specific document according to said sequence by occurrence.

8. A recording medium to be read by a computer recording a program for making the computer execute a document retrieval method comprising:

a step of retrieving each document included in a set of documents according to an entered retrieval condition, a step of sequencing each document depending on the goodness of fit to said retrieval condition, and acquiring a retrieval result by shuffling the documents in the sequence by occurrence, a step of subdividing said retrieval condition, and generating a divided retrieval condition by arbitrarily combining the retrieval conditions in the subdivided units, a step of designating a specific set of documents and a specific document included in said specific set of documents according to said divided retrieval condition and said retrieval result, a step of detecting the sequence by occurrence in each said designated specific document, and a step of calculating and displaying the occurrence distribution of said designated specific documents according to said retrieval condition relating to the set of documents including said designated specific document according to said sequence by occurrence.

9. A recording medium to be read by a computer recording a program for making the computer execute a document retrieval method comprising:

a step of retrieving each document included in a set of documents according to an entered retrieval condition, a step of sequencing each document depending on the goodness of fit to said retrieval condition, and acquiring a retrieval result by shuffling the documents in the sequence by occurrence, a step of preparing an attribute condition for specifying a to document in a specific range, a step of designating a specific set of documents and a specific document included in said specific set of documents according to said attribute condition and said retrieval result, a step of detecting said sequence by occurrence in each said designated specific document, and a step of calculating the occurrence distribution of said designated specific documents according to said retrieval condition relating to the set of documents including said designated specific document according to said sequence by occurrence.

10. A recording medium of any one of claims 6 to 9, wherein the retrieval condition to be entered is stored preliminarily.

11. A document retrieval apparatus for retrieving a set of documents composed of plural documents according to an entered retrieval condition, comprising:

document retrieving means for retrieving each document included in the set of documents according to said retrieval condition, sequencing each document depending on the goodness of fit to said retrieval condition, and acquiring a retrieval result by shuffling the documents in the sequence by occurrence, memory means of a table of sets of documents for storing the table of sets of documents designating the relation between a specific set of documents and a specific document, and calculating means of occurrence distribution for detecting said sequence by occurrence in each specific document designated by said table of sets of documents stored in said memory means of the table of sets of documents according to said retrieval result acquired by said document retrieving means, and calculating the occurrence distribution of said designated specific documents according to said retrieval condition relating to the set of documents including said designated specific document according to said sequence by occurrence.

12. A document retrieval apparatus for retrieving a set of documents composed of plural documents according to an entered retrieval condition, comprising:

document retrieving means for retrieving each document included in the set of documents according to said retrieval condition, sequencing each document depending on the goodness of fit to said retrieval condition, and acquiring a retrieval result by shuffling the documents in the sequence by occurrence, generating means of a table of sets of documents for generating the table of sets of documents designating the relation between a specific set of documents and a specific document, and calculating means of occurrence distribution for detecting said sequence by occurrence in every said specific document designated in said table of sets of documents generated by said generating means of the table of sets of documents according to said retrieval result acquired by said document retrieving means, and calculating the occurrence distribution of said designated specific documents according to said retrieval condition relating to the set of documents including said designated specific document according to said sequence by occurrence.

13. A document retrieval apparatus for retrieving a set of documents composed of plural documents according to an entered retrieval condition, comprising:

document retrieval means for retrieving each document included in the set of documents according to said retrieval condition, sequencing each document depending on the goodness of fit to said retrieval condition, and acquiring the retrieval result by shuffling the documents in the sequence by occurrence, generating means of a divided retrieval condition for subdividing said retrieval condition into retrieval condition of specific unit, and generating a divided retrieval condition by arbitrarily combining the retrieval conditions in the subdivided units, generating means of a table of sets of documents for generating a table of sets of documents designating the relation of a specific set of documents and a specific document, according to said divided retrieval condition generated by said generating means of divided retrieval condition and the retrieval result obtained by said document retrieving means, and calculating means of occurrence distribution for detecting said sequence by occurrence in every said document designated by the table of sets of documents generated by said generating means of the table of sets of documents according to said retrieval result acquired by said document retrieving means, and calculating the occurrence distribution of said designated specific documents according to said retrieval condition relating to the set of documents including said designated specific document.

14. A document retrieval apparatus for retrieving a set of documents composed of plural documents according to an entered retrieval condition, comprising:

document retrieval means for retrieving each document included in the set of documents according to said retrieval condition, sequencing each document depending on the goodness of fit to said retrieval condition, and acquiring the retrieval result by shuffling the documents in the sequence by occurrence, memory means for storing an attribute condition for specifying a document in a specific range, generating means of a table of sets of documents for generating a table of sets of documents designating the relation of a specific set of documents and a specific document, according to said attribute condition stored in said memory means and retrieval result acquired by said document retrieving means, and calculating means of occurrence distribution for detecting said sequence by occurrence in every said document of the table of sets of documents generated by said generating means of the table of sets of documents according to said retrieval result acquired by said document retrieving means, and calculating the occurrence distribution of said designated specific documents according to said retrieval condition relating to the set of documents including said designated specific document.

15. A document retrieval apparatus of any one of claims 11 to 14, further comprising:

retrieval condition memory means for storing plural retrieval conditions, and retrieval condition acquiring means for acquiring one or plural specific retrieval conditions from said plural retrieval conditions stored in said retrieval condition memory means, wherein said retrieval condition acquiring means enters said acquired specific retrieval condition into said document retrieval means and generating mans of divided retrieval condition at a specific timing.

* * * * *

UNITED STATES PATENT AND TRADEMARK OFFICE
CERTIFICATE OF CORRECTION

PATENT NO.    : 6,424,963 B1
DATED         : July 23, 2002
INVENTOR(S)   : Hayashi Ito and Mitsuhiro Sato It is certified that error appears in the above-identified patent and that said Letters Patent is hereby corrected as shown below:

<u>Column 26,</u>
Line 25, delete "mans" and insert -- means --.

Signed and Sealed this

Fourth Day of March, 2003

JAMES E. ROGAN
*Director of the United States Patent and Trademark Office*